US012266368B2

United States Patent
Sivaraman et al.

(10) Patent No.: US 12,266,368 B2
(45) Date of Patent: Apr. 1, 2025

(54) CROSS-CHANNEL ENROLLMENT AND AUTHENTICATION OF VOICE BIOMETRICS

(71) Applicant: PINDROP SECURITY, INC., Atlanta, GA (US)

(72) Inventors: Ganesh Sivaraman, Atlanta, GA (US); Elie Khoury, Atlanta, GA (US); Avrosh Kumar, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 136 days.

(21) Appl. No.: 17/165,180

(22) Filed: Feb. 2, 2021

(65) Prior Publication Data

US 2021/0241776 A1    Aug. 5, 2021

Related U.S. Application Data

(60) Provisional application No. 62/969,484, filed on Feb. 3, 2020.

(51) Int. Cl.
*G10L 17/04* (2013.01)
*G06N 3/04* (2023.01)
*G10L 17/18* (2013.01)

(52) U.S. Cl.
CPC ........... *G10L 17/04* (2013.01); *G06N 3/04* (2013.01); *G10L 17/18* (2013.01)

(58) Field of Classification Search
CPC ....... G10L 21/038; G10L 17/04; G10L 17/18; G10L 21/0388; G10L 25/30; G06N 3/04; G06N 3/0454

(Continued)

(56) References Cited

U.S. PATENT DOCUMENTS 11,087,744 B2 *   8/2021   Jansson ............... G10L 15/187
2005/0267739 A1  12/2005   Kontio et al.
(Continued)

FOREIGN PATENT DOCUMENTS

WO   WO-2019/004592 A1   1/2019
WO   WO-2019/081070 A1   5/2019

OTHER PUBLICATIONS

Goodfellow, Ian, et al. "Generative adversarial nets." Advances in neural information processing systems 27. (Year: 2014).*

(Continued)

*Primary Examiner* — Richemond Dorvil
*Assistant Examiner* — Rodrigo A Chavez
(74) *Attorney, Agent, or Firm* — Foley & Lardner LLP

(57) ABSTRACT

Embodiments described herein provide for systems and methods for voice-based cross-channel enrollment and authentication. The systems control for and mitigate against variations in audio signals received across any number of communications channels by training and employing a neural network architecture comprising a speaker verification neural network and a bandwidth expansion neural network. The bandwidth expansion neural network is trained on narrowband audio signals to produce and generate estimated wideband audio signals corresponding to the narrowband audio signals. These estimated wideband audio signals may be fed into one or more downstream applications, such as the speaker verification neural network or embedding extraction neural network. The speaker verification neural network can then compare and score inbound embeddings for a current call against enrolled embeddings, regardless of the channel used to receive the inbound signal or enrollment signal.

20 Claims, 9 Drawing Sheets

(58) Field of Classification Search
USPC .................................................. 704/246, 500
See application file for complete search history.

(56) References Cited

U.S. PATENT DOCUMENTS

| | | | | |
|---|---|---|---|---|
| 2013/0144614 | A1* | 6/2013 | Myllyla | G10L 19/0208 |
| | | | | 381/98 |
| 2013/0225128 | A1* | 8/2013 | Gomar | H04L 63/0861 |
| | | | | 455/411 |
| 2014/0195237 | A1* | 7/2014 | Bellegarda | G10L 17/14 |
| | | | | 704/249 |
| 2015/0332701 | A1* | 11/2015 | Nagel | G10L 19/265 |
| | | | | 704/500 |
| 2016/0284346 | A1* | 9/2016 | Visser | G10L 25/30 |
| 2017/0069327 | A1* | 3/2017 | Heigold | G10L 17/04 |
| 2018/0040336 | A1* | 2/2018 | Wu | G10L 19/26 |
| 2018/0276569 | A1* | 9/2018 | Oguri | G10L 15/063 |
| 2019/0318725 | A1* | 10/2019 | Le Roux | G10L 17/00 |
| 2020/0243102 | A1* | 7/2020 | Schmidt | G10L 19/005 |
| 2021/0166705 | A1* | 6/2021 | Chang | G10L 19/038 |
| 2021/0241776 | A1* | 8/2021 | Sivaraman | G06N 3/08 |
| 2022/0068285 | A1* | 3/2022 | Xiao | G10L 19/0204 |
| 2022/0223162 | A1* | 7/2022 | Assael | G06N 3/045 |
| 2022/0327377 | A1* | 10/2022 | Harpaz | G06N 3/04 |
| 2022/0343896 | A1* | 10/2022 | Tagliasacchi | G10L 25/30 |
| 2023/0269766 | A1* | 8/2023 | Guo | H04W 74/006 |
| | | | | 370/329 |

OTHER PUBLICATIONS

Mantena, G.V., Kalinli, O., Abdel-Hamid, O., & McAllaster, D. (2019). Bandwidth Embeddings for Mixed-bandwidth Speech Recognition. ArXiv, abs/1909.02667. (Year: 2019).*

Yamamoto, H., Lee, K.A., Okabe, K., Koshinaka, T. (2019) Speaker Augmentation and Bandwidth Extension for Deep Speaker Embedding. Proc. Interspeech 2019, 406-410, doi: 10.21437/Interspeech.2019-1508 (Year: 2019).*

Mantena, G.V., Kalinli, O., Apbdel-Hamid, O., & McAllaster, D. (2019). Bandwidth Embeddings for Mixed-bandwidth Speech Recognition. ArXiv, abs/1909.02667. (Year: 2019).*

International Report on Patentability on PCT Appl. Ser. No. PCT/US2021/016189 dated Aug. 18, 2022 (12 pages).

International Search Report and Written Opinion on PCT Appl. Ser. No. PCT/US2021/016189 dated Apr. 14, 2021 (14 pages).

Examination Report No. 1 on AU app. 2021217948 dated Mar. 21, 2023.

First Examiner's Requisition on Canadian Application 3, 166,263 dated Aug. 8, 2023 (4 pages).

European Search Report on Application 21751168.2 dated Jan. 25, 2024 (12 pages).

Li Kehuang et al: "A deep neural network approach to speech bandwidth expansion", 2015 IEEE International Conference on Acoustics, Speech and Signal Processing (ICASSP), IEEE, Apr. 19, 2015 (Apr. 19, 2015), pp. 4395-4399, XP033187591, Doi: 10.1109/ICASSP.2015.7178801 [retrieved on Aug. 4, 2015].

Pulakka H et al: "Bandwidth Extension of Telephone Speech Using a Neural Network and a Filter Bank Implementation for Highband Mel Spectrum", IEEE Transactions on Audio, Speech and Language Processing, IEEE, US, vol. 19, No. 7, Sep. 1, 2011 (Sep. 1, 2011), pp. 2170-2183, XP011476691, ISSN: 1558-7916, DOI: 10.1109/TASL.2011.2118206.

Second Examiner's Requisition dated May 13, 2024 on CA App. 3, 166,263 (4 pages).

* cited by examiner

CROSS-CHANNEL ENROLLMENT AND AUTHENTICATION OF VOICE BIOMETRICS

CROSS-REFERENCE TO RELATED APPLICATIONS

This application claims priority to U.S. Provisional Application No. 62/969,484, filed Feb. 3, 2020, which is incorporated by reference in its entirety.

TECHNICAL FIELD

This application generally relates to systems and methods for training and deploying audio processing neural networks. In particular, the application relates to neural networks employed for voice biometrics systems.

BACKGROUND

The advent of Internet of Things (IoT) devices has led to newer channels of machines interacting with voice commands. Oftentimes, many of the interactions with devices involve performing operations on private and sensitive data. Many new mobile apps and home personal assistants are enabling financial transactions using voice based interactions with the device. The call center and, in particular, interactions with human agents at call centers, is no longer the only instance of voice-based interactions for institutions managing critical personal information. It is essential to reliably verify the identity of callers/speakers, who access and manage user accounts by operating various edge devices or IoT devices, or by contacting call centers, according to a uniform level of accuracy and security.

Automatic Speech Recognition (ASR) and Automatic Speaker Verification (ASV) systems are often used for security and authentication features, as well as other voice-based operations. But ASRs and ASVs frequently encounter audio from multiple different types of devices sampled at different sampling rates. Audio recorded and transmitted via more sophisticated communication channels (e.g., edge devices, IoTs, VoIP) are often sampled at 16 kHz with a wide bandwidth of 0-8 kHz. Traditional telephony audio is band-limited to a frequency range of 0.3-3.4 kHz, sampled at 8 kHz and also encoded with speech coding algorithms. Speech technologies usually obtain superior performance on wideband audio data because of the additional information available in the higher frequency bands. The performance of speaker recognition systems improves with the inclusion of higher frequency bands. A speaker recognition system trained on wideband speech performs poorly on narrowband audio due to the mismatch in the training and testing condition. The missing higher frequency bands in narrowband speech leads to the degraded performance of wideband trained speaker recognition systems on telephony speech.

What is therefore needed are improved approaches to voice biometrics and speaker recognition that control for, and mitigate against, variations in audio signals received across any number of communications channels.

SUMMARY

Disclosed herein are systems and methods capable of addressing the above described shortcomings and may also provide any number of additional or alternative benefits and advantages. Embodiments described herein provide for systems and methods for voice-based cross-channel enrollment and authentication. In particular, the systems and methods described herein control for, and mitigate against, variations in audio signals received across any number of communications channels by training and employing a neural network architecture comprising a speaker verification neural network and a bandwidth expansion neural network. The bandwidth expansion neural network is trained on narrowband audio signals to produce and generate estimated wideband audio signals corresponding to the narrowband audio signals. These estimated wideband audio signals may be fed into one or more downstream applications, such as the speaker verification neural network or embedding extraction neural network. The speaker verification neural network can then compare and score inbound embeddings for a current call against enrolled embeddings, regardless of the channel used to receive the inbound signal or enrollment signal.

In an embodiment, a computer-implemented method comprises obtaining, by a computer, a plurality of training audio signals including one or more lower-bandwidth audio signals having a first bandwidth and one or more corresponding higher-bandwidth audio signals having a second bandwidth, wherein the first bandwidth is comparatively lower than the second bandwidth; training, by the computer, a bandwidth expander comprising a set of one or more neural network layers of a neural network, the bandwidth expander trained by applying the neural network on the plurality of training audio signals; receiving, by the computer, an inbound audio signal having the first bandwidth; and generating, by the computer, an estimated inbound audio signal having the second bandwidth by applying the bandwidth expander of the neural network on the inbound audio signal.

In another embodiment, a system comprises a non-transitory machine-readable memory configured to store machine-readable instructions for one or more neural networks; and a computer comprising a processor obtain a plurality of training audio signals including one or more lower-bandwidth audio signals having a first bandwidth and one or more corresponding higher-bandwidth audio signals having a second bandwidth, wherein the first bandwidth is comparatively lower than the second bandwidth; train a bandwidth expander comprising a set of one or more neural network layers of a neural network, the bandwidth expander trained by applying the neural network on the plurality of training audio signals; receive an inbound audio signal having the first bandwidth; and generate an estimated inbound audio signal having the second bandwidth by applying the bandwidth expander of the neural network on the inbound audio signal.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
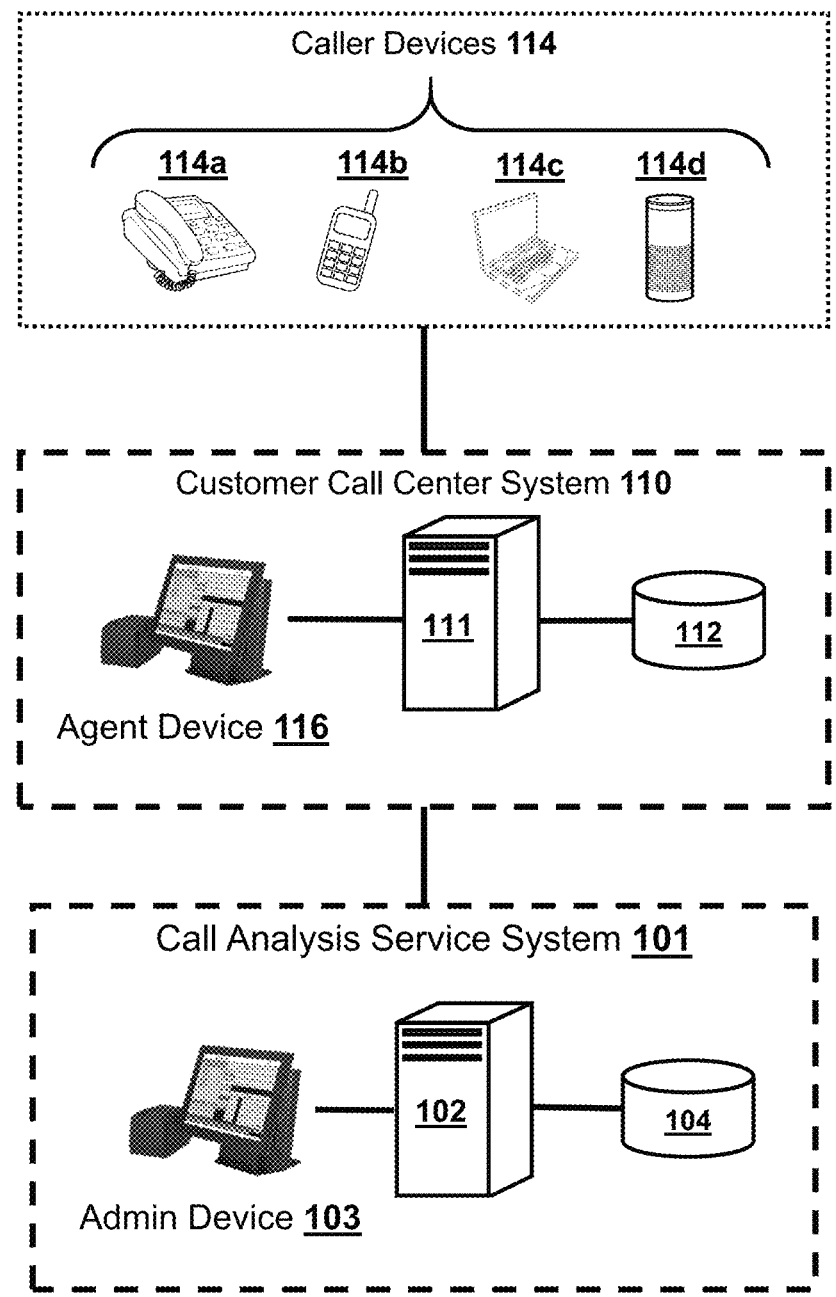
FIG. 1 shows components of a system for receiving and analyzing telephone calls, according to an illustrative embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Voice biometrics for speaker recognition and other operations (e.g., authentication) typically rely upon models or vectors generated from a universe of speaker samples and samples of a particular speaker. As an example, during a training phase (or re-training phase), a server or other computing device executes a speech recognition engine (e.g., artificial intelligence and/or machine-learning programmatic software) that is trained to recognize and distinguish instances of speech using a plurality of training audio signals. A neural network architecture outputs certain results according to corresponding inputs and evaluates the results according to a loss function by comparing the expected output against the observed output. The training operations then tailor the weighted values of the neural network architecture (sometimes called hyperparameters) and reapply the neural network architecture to the inputs until the expected outputs and observed outputs converge. The server then fixes (e.g., freezes or sets) the hyperparameters and, in some cases, disables one or more layers of the neural network architecture used for training.

The server can further train the speaker recognition engine to recognize a particular speaker during an enrollment phase for the particular enrollee-speaker. The speech recognition engine can generate an enrollee voice feature vector (sometimes called a "voiceprint") using enrollee audio signals having speech segments involving the enrollee. During later inbound phone calls, the server refers to the voiceprints in order to confirm whether later audio signals involve the enrollee based upon matching a feature vector extracted from the later inbound call against the enrollee's voiceprint. These approaches are generally successful and adequate for detecting the enrollee in the inbound call.

A concern, however, is that the quality of the inbound signals vary across the available communications channels. This variance often diminishes the neural network architecture's performance and/or frustratingly requires the enrollees to provide distinct enrollment signals for each particular communication channel. In some cases, distinct neural network architectures must be maintained for each particular communication channel, which can be unwieldy and diminish performance.

As described herein, the system trains and employs a bandwidth expansion neural network (sometimes called a "bandwidth expander"). The bandwidth expander ingests narrowband audio signals arriving via a communication channel configured for low quality data (e.g., low sampling rate, low bandwidth) and generates corresponding estimated wideband audio signals. These estimated wideband audio signals may be fed into one or more downstream applications, such as the speaker verification neural network or embedding extraction neural network. The speaker verification neural network can then compare and score inbound embeddings for a current call against enrolled embeddings, regardless of the channel used to receive the inbound signal or enrollment signal.

The embodiments described herein implement one or more neural network architectures comprising any number of layers configured to perform certain operations, such as audio data ingestion, pre-processing operations, data augmentation operations, bandwidth expansion, embedding extraction, loss function operations, and classification operations, among others. To perform the various operations, the one or more neural network architectures comprise any number of layers, such as input layers, layers of a bandwidth expander, layers of an embedding extractor, fully-connected layers, loss layers, and layers of a classifier, among others.

It should be appreciated that the layers or operations may be performed by any number of neural network architectures. As an example, a bandwidth expander neural network (having the bandwidth expansion layers) and a speaker recognizer neural network (having the embedding extractor layers) could be distinct neural network architectures executed by the server. As another example, the bandwidth expansion neural network (having the bandwidth expansion layers) and the speaker recognizer neural network (having the embedding extractor layers) could be components of the same neural network architecture executed by the server. Additionally or alternatively, the layers performing different operations can define different types of neural network architectures. For example, the layers for the embedding extractor could be a ResNet neural network architecture, and the layers for the bandwidth expander could be another type of convolutional neural network (CNN) or deep neural network (DNN).

Moreover, certain operations, such as pre-processing operations and data augmentation operations or may be performed by a computing device separately from the neural network architecture or as layers of the neural network architecture. Non-limiting examples of in-network augmentation and pre-preprocessing may be found in U.S. application Ser. No. 17/066,210, filed Oct. 8, 2020, and Ser. No. 17/079,082, filed Oct. 23, 2020, which are incorporated by reference herein.

Example System Components

FIG. 1 shows components of a system 100 for receiving and analyzing telephone calls for cross-channel voice biometrics, according to an illustrative embodiment. The system 100 comprises a call analytics system 101, call center systems 110 of customer enterprises (e.g., companies, government entities, universities), and caller devices 114. The call analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1 shows the analytics server 102 in as a distinct computing device from the analytics database 104. In some embodiments, the analytics database 104 may be integrated into the analytics server 102.

It should be appreciated that embodiments described with respect to FIG. 1 are merely examples of the cross-channel voice biometrics described herein and not necessarily limiting on other potential embodiments. The description of FIG. 1 mentions circumstances in which a caller places a call through various communications channels to contact and interact with the services offered by the call center system 110, though the operations and features of the cross-channel voice biometrics techniques described herein may be applicable to any circumstances involving a voice-based interface between the caller and the services offered by the call center system 110.

For instance, the cross-channel voice biometrics systems and operations described herein could be implemented in any system that receives and authenticates speaker audio inputs via multiple communications channels. End-users can access user accounts or other features of the service provider and service provider's call center system 110 and interact with human agents of or with software applications (e.g., cloud application) hosted by call center servers 111. In some implementations, the users of the service provider's call center system 110 may access the user accounts or other features of the service provider by placing calls using the various types of user devices 114. The users may also access the user accounts or other features of the service provider using software executed by certain user devices 114 configured to exchange data and instructions with software programming (e.g., the cloud application) hosted by the call center servers 111. The customer call center 110 may include, for example, human agents who converse with callers during telephone calls, Interactive Voice Response (IVR) software executed by the call center server 111, or the cloud software programming executed by the call center server 111. The customer call center 110 need not include any human agents, such that the end-user interacts only with the IVR system or the cloud software application.

As an example, in some cases, the customer call center system 110 includes human agents and/or an IVR system that handle telephone calls originating from, for example, landline devices 114a (a narrowband channel) or mobile devices 114b (a wideband channel). As another example, in some cases, the call center server 111 executes the cloud application that is accessible to a corresponding software application on a user device 114, such as a mobile device 114b, computing device 114c, or edge device 114d. The user interacts with the user account or other features of the service provider using the user-side software application. In such cases, the call center system 110 need not include a human agent or the user could instruct call center server 111 to redirect the software application to connect with an agent device 116 via another channel, thereby allowing the user to speak with a human agent when the user is having difficulty.

Various hardware and software components of one or more public or private networks may interconnect the various components of the system 100 via various communications channels. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The caller devices 114 may be any communications or computing device that the caller operates to access the services of the call center system 100 through the various communications channels. For instance, the caller may place the call to the call center system 110 through a telephony network or through a software application executed by the caller device 114. Non-limiting examples of caller devices 114 may include landline phones 114a, mobile phones 114b, calling computing devices 114c, or edge devices 114d. The landline phones 114a and mobile phones 114b are telecommunications-oriented devices (e.g., telephones) that communicate via telecommunications channels. The caller device 114 is not limited to the telecommunications-oriented devices or channels. For instance, in some cases, the mobile phones 114b may communicate via a computing network channel (e.g., the Internet). The caller device 114 may also include an electronic device comprising a processor and/or software, such as a caller computing device 114c or edge device 114d implementing, for example, voice-over-IP (VoIP) telecommunications, data streaming via a TCP/IP network, or other computing network channel. The edge device 114d may include any Internet of Things (IoT) device or other electronic device for network communications. The edge device 114d could be any smart device capable of executing software applications and/or performing voice interface operations. Non-limiting examples of the edge device 114d may include voice assistant devices, automobiles, smart appliances, and the like.

The call center system 110 comprises various hardware and software components that capture and store various types of data or metadata related to the caller's contact with the call center system 110. This data may include, for example, audio recordings of the call or the caller's voice and metadata related to the protocols and software employed for the particular communication channel. The audio signal captured with the caller's voice has a quality based on the particular communication used. For example, the audio signals from the landline phone 114a will have a lower sampling rate and/or lower bandwidth compared to the sampling rate and/or bandwidth of the audio signals from the edge device 114d.

The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services of the particular enterprise organization.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes audio-processing software that includes one or more neural network architectures having neural network layers for bandwidth expansion and speaker recognition. In some cases, the neural network architecture architectures may perform additional operations or functions, such as audio input enhancement, speaker verification or authentication (including cross-channel speaker verification), and speaker diarization, among others. For ease of description, the analytics server 102 is described as executing a single neural network architecture having the bandwidth expander and the embedding extractor, though multiple neural network architectures could be employed in some embodiments.

The neural network architecture operates logically in several operational phases, including a training phase, an enrollment phase, and a deployment phase (sometimes referred to as a test phase or testing), though some embodiments need not perform the enrollment phase. The inputted audio signals processed by the analytics server 102 and the neural network architecture include training audio signals, enrollment audio signals, and inbound audio signals processed during the deployment phase. The analytics server 102 applies the neural network architecture to each type of inputted audio signal during the corresponding operational phase.

The analytics server 102 or other computing device of the system 100 (e.g., call center server 111) can perform various pre-processing operations and/or data augmentation operations on the input audio signals. Non-limiting examples of the pre-processing operations on inputted audio signals include: performing bandwidth expansion, down-sampling or up-sampling, extracting low-level features, parsing and segmenting the audio signal into frames or segments, and performing one or more transformation functions (e.g., FFT, SFT), among other potential pre-processing operations. Non-limiting examples of augmentation operations include performing bandwidth expansion, down-sampling or up-sampling, audio clipping, noise augmentation, frequency augmentation, and duration augmentation, among others. The analytics server 102 may perform the pre-processing or data augmentation operations prior to feeding the input audio signals into input layers of the neural network architecture. Additionally or alternatively, the analytics server 102 may execute pre-processing or data augmentation operations when executing the neural network architecture, where the input layers (or other layers) of the neural network architecture perform the pre-processing or data augmentation operations. For example, the neural network architecture may comprise in-network data augmentation layers that perform data augmentation operations on the input audio signals fed into the neural network architecture.

During the training phase, the analytics server 102 receives training audio signals of various lengths and characteristics (e.g., bandwidth, sample rate, types of degradation) from one or more corpora, which may be stored in an analytics database 104 or other storage medium. The training audio signals include clean audio signals (sometimes referred to as samples) and simulated audio signals, each of which the analytics server 102 uses to train the various layers of the neural network architecture. The clean audio signals are audio samples containing speech in which the speech and the features are identifiable by the analytics server 102.

The analytics server 102 may retrieve the simulated audio signals from the more analytics databases 104 and/or generate the simulated audio signals by performing various data augmentation operations. In some cases, the data augmentation operations may generate a simulated audio signal for a given input audio signal (e.g., training signal, enrollment signal), in which the simulated audio signal contains manipulated features of the input audio signal mimicking the effects a particular type of signal degradation or distortion on the input audio signal. The analytics server 102 stores the training audio signals into the non-transitory medium of the analytics server 102 and/or the analytics database 104 for future reference or operations of the neural network architecture.

For training or developing enrollments for the bandwidth expander, the training audio signals or enrollment audio signals have varied bandwidths associated with the potential communications channels of the system 100. In this way, the layers of the bandwidth expander are tuned to generate an estimated wideband audio signal for the training audio s input audio signals having the various bandwidths used by the communications channels.

In some implementations, the analytics server 102 determines that the training/enrollment audio signals have the same bandwidth or that there are too few (below a threshold amount) training/enrollment audio signals of any particular bandwidth. In such implementations, the analytics server 102 performs one or more augmentation processes to generate simulated training/enrollment signals having varied bandwidths, thereby increasing the volume of training/enrollment signals for tuning the bandwidth expander. For example, the analytics server 102 executes a codec program to generate simulated audio signals, whereby the analytics server 102 passes a wideband (e.g., 16 kHz) training audio file through the codec program to generate a corresponding narrowband (e.g., 8 kHz) simulated audio file.

During the training phase and, in some implementations, the enrollment phase, one or more fully-connected and/or feed-forward layers generate and output predicted estimated wideband signals for the training audio signals. Loss layers perform various loss functions to evaluate the distances between the features of the estimated wideband signals and expected wideband signals, as indicated by labels associated with training/enrollment signals. The loss layers, or other functions executed by the analytics server 102, tune the hyperparameters of the neural network architecture until the distance between the predicted estimated wideband signals and the expected estimated wideband signals satisfies a threshold.

During the enrollment operational phase, an enrollee speaker, such as an end-consumer of the call center system 110, provides (to the call analytics system 101) a number of enrollee audio signals containing examples of the enrollee speech. As an example, the enrollee could respond to various interactive voice response (IVR) prompts of IVR software executed by a call center server 111 via a telephone channel. As another example, the enrollee could respond to various prompts generated by the call center server 111 and exchanged with a software application of the edge device 114d via a corresponding data communications channel. The call center server 111 then forwards the recorded responses containing bona fide enrollment audio signals to the analytics server 102. The analytics server 102 applies the trained neural network architecture to each of the enrollee audio samples and generates corresponding enrollee feature vectors (sometimes called "enrollee embeddings"), though the analytics server 102 disables certain layers, such as layers employed for training the neural network architecture. The analytics server 102 generates an average or otherwise algorithmically combines the enrollee feature vectors and stores the enrollee feature vectors into the analytics database 104 or the call center database 112. Optionally, the edge device generates the enrollee feature vectors by locally applying (on-device) the trained neural network architecture to each of the enrollee audio samples and then sends the enrollee feature vectors to the call center service 111 or analytics server 102.

Similar details of the training and enrollment phases for the speaker verification neural network have described in U.S. application Ser. Nos. 17/066,210 and 17/079,082, which are incorporated by reference. In addition, the neural network architectures described herein may further include the layers of the speaker verification neural network, where the layers of the speaker verification neural network are executed in conjunction with the layers of the bandwidth expander neural network. In some embodiments, the speaker verification neural network receives the estimated wideband audio signals outputted by the bandwidth expander. Additionally or alternatively, the speaker verification may apply the bandwidth expander to the audio signals as a data augmentation operation.

Following the training phase, the analytics server 102 stores the neural network architecture into the analytics database 104 or call center database 112. When a call center server 111, agent device 116, admin device 103, or user device 114 instructs the analytics server 102 to enter an enrollment phase for extracting features of enrollee audio signals or tuning the tuning the neural network architectures for the enrollee audio signals, the analytics server 102 retrieves the trained neural network architecture from the database 104, 112. The analytics server 102 then stores the extracted enrollee embeddings and trained neural network architecture into the database 104, 112 for the deployment phase.

During the deployment phase, the analytics server 102 receives the inbound audio signal of the inbound call, as originated from the caller device 114 of an inbound caller through a particular communications channel. The analytics server 102 applies the neural network architecture on the inbound audio signal to extract the features from the inbound audio and determine whether the caller is an enrollee who is enrolled with the call center system 110 or the analytics system 101. In some cases, the analytics server 102 evaluates the bandwidth of the inbound audio signal to determine whether to apply the bandwidth expander on the inbound audio signal. If the analytics server 102 determines that the inbound audio signal has a narrow bandwidth, then the analytics server 102 applies the bandwidth expander to the narrowband inbound signal. Conversely, the analytics server 102 need not apply the bandwidth expander to a wideband inbound signal when the analytics server 102 determines that the inbound audio signal has a wide bandwidth. During deployment, the analytics server 102 applies the operational layers of the neural network architecture, such as the input layers (e.g., pre-processing layers, augmentation layers), bandwidth expansion layers, and embedding extraction layers on the inbound audio signal. In some embodiments, the analytics server 102 may disable certain layers employed for training or enrollment (e.g., classification layers, loss layers).

The analytics server 102 generates the estimated wideband signal for the inbound audio signal, by applying the neural network architecture to the inbound signal. Following the deployment phase, the analytics server 102 (or another device of the system 100) may execute any number of various downstream operations employing the estimated wideband signal. For example, the estimated wideband signal produced by the neural network architecture is, in many cases, an enhanced version of the inbound audio signal having comparatively less degradation of one or more types of degradation. The inbound audio signal having a relatively narrow bandwidth (e.g., 8 kHz) would have generally low quality and could include certain degradations, such as background noise. The neural network architecture not only generates an estimated wideband signal with a comparatively wider bandwidth (e.g., 16 kHz), but the estimated wideband signal would also be de-noised due to the various data augmentation operations employed when training and developing the neural network architecture. The downstream application could be a data-streaming service, whereby the analytics server 102 forwards or streams the estimated wideband signal to any number of devices (e.g., call center server 111, caller devices 114).

As another example of a downstream application, the analytics server 102 could feed the estimated wideband signal into the speaker verification neural network. The speaker verification neural network may perform the various processes to extract embeddings from the estimated wideband signal to recognize the inbound speaker or perform any number of additional downstream operations using the outputs of the speaker verification neural network (e.g., speaker authentication, speaker diarization).

The analytics database 104 and/or the call center database 112 may contain any number of corpora of training audio signals that are accessible to the analytics server 102 via one or more networks. In some embodiments, the analytics server 102 employs supervised training to train the neural network, where the analytics database 104 includes labels associated with the training audio signals that indicate, for example, the characteristics (e.g., bandwidth) or features of the training signals. The analytics server 102 may also query an external database (not shown) to access a third-party corpus of training audio signals. An administrator may configure the analytics server 102 to select the training audio signals having certain bandwidths or other characteristics.

The call center server 111 of a call center system 110 executes software processes for managing a call queue and/or routing calls made to the call center system 110 through the various channels, where the processes may include, for example, routing calls to the appropriate call center agent devices 116 based on the inbound caller's comments, instructions, IVR inputs, or other inputs submitted during the inbound call. The call center server 111 can capture, query, or generate various types of information about the call, the caller, and/or the caller device 114 and forward the information to the agent device 116, where a graphical user interface (GUI) of the agent device 116 displays the information to the call center agent. The call center server 111 also transmits the information about the inbound call to the call analytics system 101 to preform various analytics processes on the inbound audio signal and any other audio data. The call center server 111 may transmit the information and the audio data based upon preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or call center system 110 and to issue queries and instructions to such components.

The agent device 116 of the call center system 110 may allow agents or other users of the call center system 110 to configure operations of devices of the call center system 110. For calls made to the call center system 110, the agent device 116 receives and displays some or all of the relevant information associated with the call routed from the call center server 111.

Example Processes
Bandwidth Expansion Training

Figure 2:
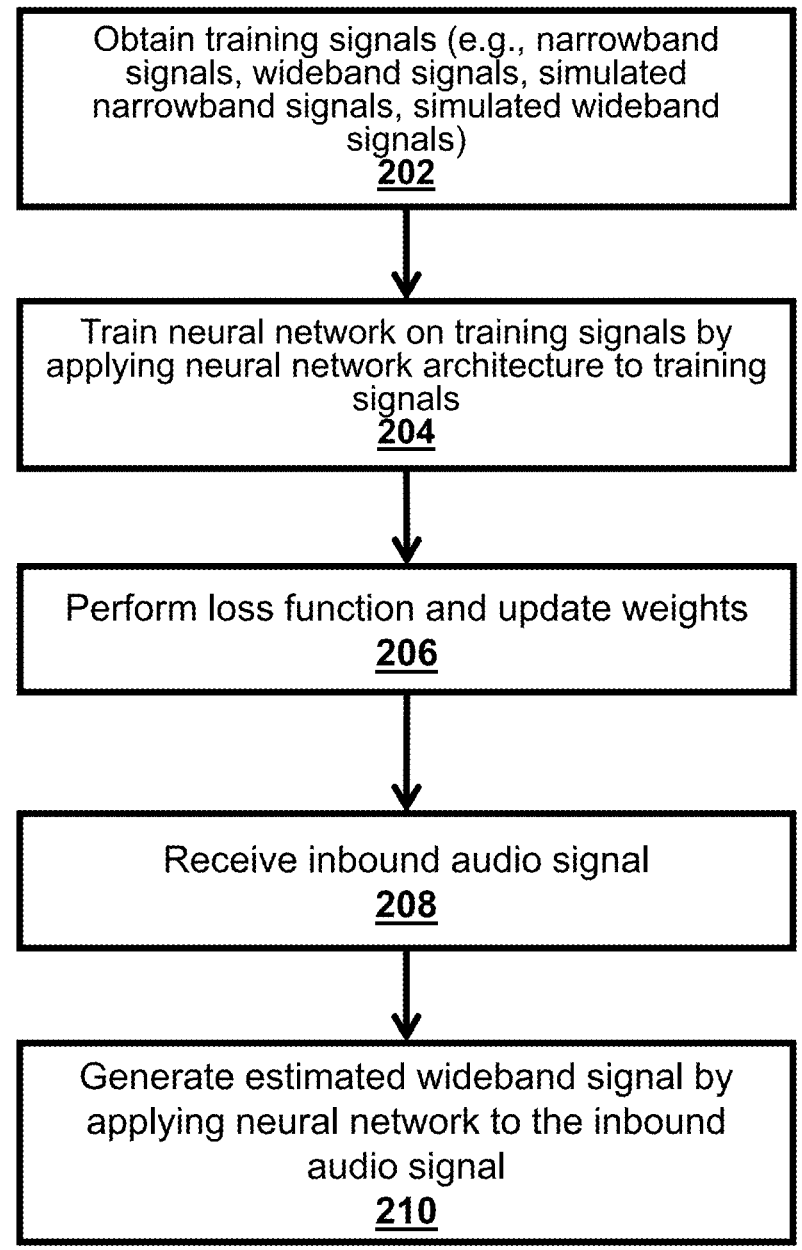
FIG. 2 shows steps of a method for implementing one or more neural networks for bandwidth expansion.

FIG. 2 shows steps of a method 200 for implementing one or more neural networks for bandwidth expansion. Embodiments may include additional, fewer, or different operations than those described in the method 200. The method 200 is performed by a server executing machine-readable software code of the neural network architectures, though it should be appreciated that the various operations may be performed by one or more computing devices and/or processors.

In step 202, a server places the neural network into a training operational phase and the server obtains any number (sometimes thousands or hundreds of thousands) of training audio signals, which could include any combination of narrowband training signals, wideband training signals, simulated narrowband signals, and simulated wideband signals.

The server or layers of the neural network architecture may perform various pre-processing operations on an input audio signal (e.g., training audio signal, enrollment audio signal, inbound audio signal). These pre-processing operations may include, for example, extracting low-level features from the audio signals and transforming these features from a time-domain representation into a frequency-domain representation by performing FFT and/or SFT operations. The pre-processing operations may also include parsing the audio signals into frames or sub-frames, and performing various normalization or scaling operations. Optionally, the server performs any number of pre-processing operations prior to feeding the audio data into input layers of the neural network. The server may perform the various pre-processing operations in one or more of the operational phases, though the particular pre-processing operations performed may vary across the operational phases. The server may perform the various pre-processing operations separately from the neural network architecture or as in-network layer of the neural network architecture.

The server or layers of the neural network architecture may perform various augmentation operations on the input audio signal (e.g., training audio signal, enrollment audio signal). The augmentation operations generate various types of distortion or degradation for the input audio signal, such that the resulting audio signals are ingested by, for example, the convolutional operations. The server may perform the various augmentation operations as separate operations from the neural network architecture or as in-network augmentation layers. Moreover, the server may perform the various augmentation operations in one or more of the operational phases, though the particular augmentation operations performed may vary across each of the operational phases.

In some cases, the server generates simulated narrowband signals and/or simulated wideband signals when the server performs various augmentation operations on the corpus of narrowband training signals and/or wideband training signals. For example, the server may receive wideband training audio signals from a database and generate simulated narrowband audio signals corresponding to the wideband training signals. The server down-samples the wideband training signals by executing one or more known down-sampling techniques on the wideband training audio signals. Additionally or alternatively, the server executes a codec program on the wideband training signals, thereby generating the corresponding simulated narrowband audio signals.

In optional embodiments, the server may select narrowband training audio signals and generate simulated wideband audio signals corresponding to the narrowband training signals. The server up-samples the narrowband training audio signals by executing one or more known up-sampling techniques on the narrowband training signals. Additionally or alternatively, the server executes a codec program on the narrowband training signals, thereby generating the corresponding simulated wideband signals.

In step 204, the server trains the neural network architecture for bandwidth expansion by applying the neural network architecture to the training audio signals. The server applies the neural network to the each of the training audio signal to train layers of a bandwidth expander and one or more additional layers (e.g., fully-connected layers), thereby training the neural network architecture to produce an estimated wideband signal (sometimes called an "estimated inbound audio signal") for a given inbound narrowband signal.

In step 206, the server performs loss function and update hyperparameters of the bandwidth expander. The neural network architecture comprises one or more loss layers for evaluating the level of error using speaker labels associated with the training signals. The training signals include various information indicating, for example, the values or features of an expected estimated wideband signal corresponding to the predicted estimated wideband signal. The loss layers may perform various loss functions (e.g., means-square error loss function) based upon the differences or similarities (e.g., level of error) between the predicted (outputted) estimated signal and the expected estimated signal. Loss layers of the neural network architecture may adjust the hyperparameters of the bandwidth expander to improve the level of error until a threshold level of error is satisfied.

When training is completed, the server stores the hyperparameters into memory of the server or other memory location. The server may also disable one or more layers of the neural network in order to keep the hyperparameters fixed.

In step 208, during deployment, the server receives a narrowband inbound audio signal from an inbound speaker via a narrowband communication channel. The neural network architecture applies any number of pre-processing and/or data augmentation operations on the inbound audio signal to prepare the inbound audio for the bandwidth expansion neural network. As mentioned, the pre-processing operations may include parsing the audio signals into frames or sub-frames, transforming the raw audio signal into a spectrogram energy/frequency representation, extracting the spectral-temporal features, and performing various normalization or scaling operations. The features of the audio signal are then fed into the bandwidth expansion neural network layers.

In step 210, the server ingests the inbound audio generates the estimated wideband signal for the input audio signal by applying bandwidth expansion neural network layers on the inbound audio signal. The trained convolutional and fully-connected layers of the bandwidth expansion neural network generate the estimated wideband signal based upon the features extracted from the narrowband inbound signal. The outputted estimated wideband signal can then be fed into any number of downstream functions, such as a speaker verification neural network.

Speaker Verification and Bandwidth Expansion

Figure 3:
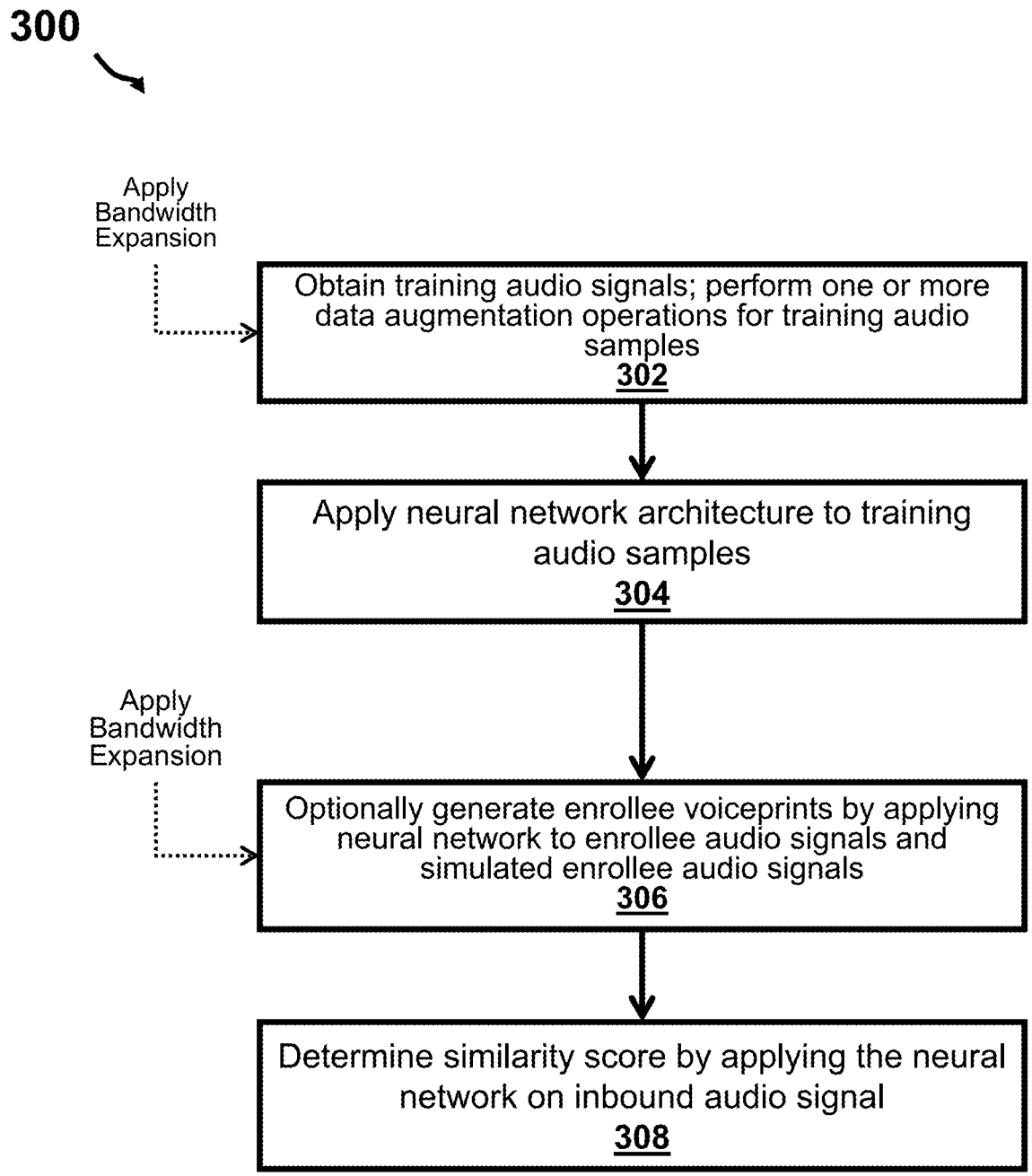
FIG. 3 shows steps of a method for implementing a neural network architecture for speaker verification (sometimes called an embedding extractor).

FIG. 3 shows steps of a method 300 for implementing a neural network architecture for speaker verification (sometimes called an embedding extractor). Embodiments may include additional, fewer, or different operations than those described in the method 300. The method 300 is performed by a server executing machine-readable software code of the neural network architectures, though it should be appreciated that the various operations may be performed by one or more computing devices and/or processors.

The server employs a bandwidth expansion neural network (sometimes called a bandwidth expander) that benefits and improves upon the speaker verification neural network. For ease of discussion, the neural network architecture of FIG. 3 comprises the layers of the bandwidth expansion neural network and the speaker verification neural network, though the bandwidth expansion neural network and the speaker verification neural network could be components of distinct neural network architectures.

In step 302, the server places the neural network architecture into a training operational phase and obtains training signals, which may include clean audio signals and simulated audio signals. The server receives the training audio signals from various data sources, such as databases or outputs of the bandwidth expander. The server may also generate the simulated audio signals by performing various data augmentation operations.

As mentioned, the server or layers of the neural network architecture may perform various pre-processing operations on an input audio signal (e.g., training audio signal, enrollment audio signal, inbound audio signal). Additionally or alternatively, the server or layers of the neural network architecture may perform various augmentation operations on the input audio signal (e.g., training audio signal, enrollment audio signal).

The server may receive the training audio signals from a database containing a corpus of training audio signals, including any combination of clean audio signals and simulated audio signals. The simulated audio signals could include, for example, various pre-recorded audio signals that the server employs and applies against the clean audio signals for certain data augmentation operations in order to generate further simulated audio signals corresponding to the clean audio signals.

For example, certain simulated audio signals may include recordings of common additive background noise. The server executes an additive noise augmentation operation that applies these noise recordings to the clean audio signals, thereby generating further simulated audio signals having the additive noise and the original clean audio signal. As another example, the data augmentation processes can include applying the bandwidth expander to the training audio signals to produce corresponding estimated wideband signals, which are then added to the simulated audio signals.

In step 304, the server trains the neural network architecture for speaker verification by applying the neural network architecture to the training audio samples. The server applies the neural network to the training signals to train a classifier layer to identify, for example, speech portions of audio. The fully connected layer or classification layer uses labels containing information about the training signals to determine the level of error of training feature vectors (sometimes referred to as "training embeddings") produced by an embedding extractor of the neural network. The server feeds each training audio signal to the neural network architecture, which the neural network architecture uses to generate the predicted output by applying the current state of the neural network architecture to the training audio signal. The classifier layer or other loss layer of the neural network architecture adjusts the hyperparameters of the neural network until the training feature vectors converge with expected feature vectors, where the labels include the information or values for the expected feature vectors. When training is completed, the server stores the hyperparameters into memory of the server or other memory location. The server may also disable one or more layers of the neural network in order to keep the hyperparameters fixed.

In step 306 the server extracts one or more enrollee embeddings (sometimes called enrollee voiceprints) by applying the trained neural network on one or more enrollee audio signals. The neural network architecture extracts an enrollee feature vectors for each enrollee audio signal. The statistics layers of the neural network architecture may perform various statistical and algorithmic combination functions to combine the enrollee feature vectors, thereby generating the enrollee voiceprint.

In some case, prior to applying the trained neural network architecture on the enrollee audio signals, the server generates one or more simulated enrollee signals by performing one or more data augmentation operations on the enrollee audio signals. For example, the server may determine there are too few enrollee audio signals having a particular bandwidth. The server may apply the trained bandwidth expander on the enrollee audio signals to generate the simulated estimated enrollee signals having a higher bandwidth to the corresponding enrollee audio signals. Additionally or alternatively, the server may perform a down-sampling technique or execute a codec program to generate simulated enrollee signals having a lower bandwidth to the corresponding enrollee audio signals. The enrollee signals and the simulated enrollee signals are fed into to the embedding extraction layers to extract the enrollee voiceprint.

As another example, certain enrollee audio signals may include recordings of common additive background noise. The server executes an additive noise augmentation operation that applies these noise recordings to the clean audio signals, thereby generating further simulated enrollee audio signals having the additive noise and the original clean audio signal. As another example, the data augmentation processes can include applying the bandwidth expander to the enrollee audio signals to produce corresponding estimated enrollee wideband signals, which are then added to the simulated enrollee audio signals.

In step 308, the server determines a similarity score (sometimes called a likelihood score) by applying the neural network on an inbound audio signal. The server enters a deployment operational phase (sometimes called "testing") and typically enables each of the layers of the neural network, except for the classification layer. The server receives an input audio signal from a speaker and feeds the input audio signal into the neural network architecture. In some cases, the layers of the neural network may before certain pre-processing operations, such as applying a FFT algorithm to transform the audio data of the input audio signal from a time-domain representation to a frequency-domain representation. The server may perform any number of additional or alternative pre-processing and data augmentation operations on the inbound audio signal.

The server applies the neural network on the input audio signal and generates an inbound voiceprint embedding. The fully connected layers output inbound embedding and a similarity score indicating the distance between the inbound voiceprint embedding and the enrollee embedding. The server identifies a match (or a likely match) between the inbound speaker and the enrollee when the similarity score satisfies a threshold value. One or more downstream operations (e.g., speaker authentication, speaker diarization) can use the match determination, the similarity score, and/or the test feature vector to perform the given functions.

Example Neural Network Architectures

Example Neural Network Architecture for Bandwidth Expansion

Figure 4:
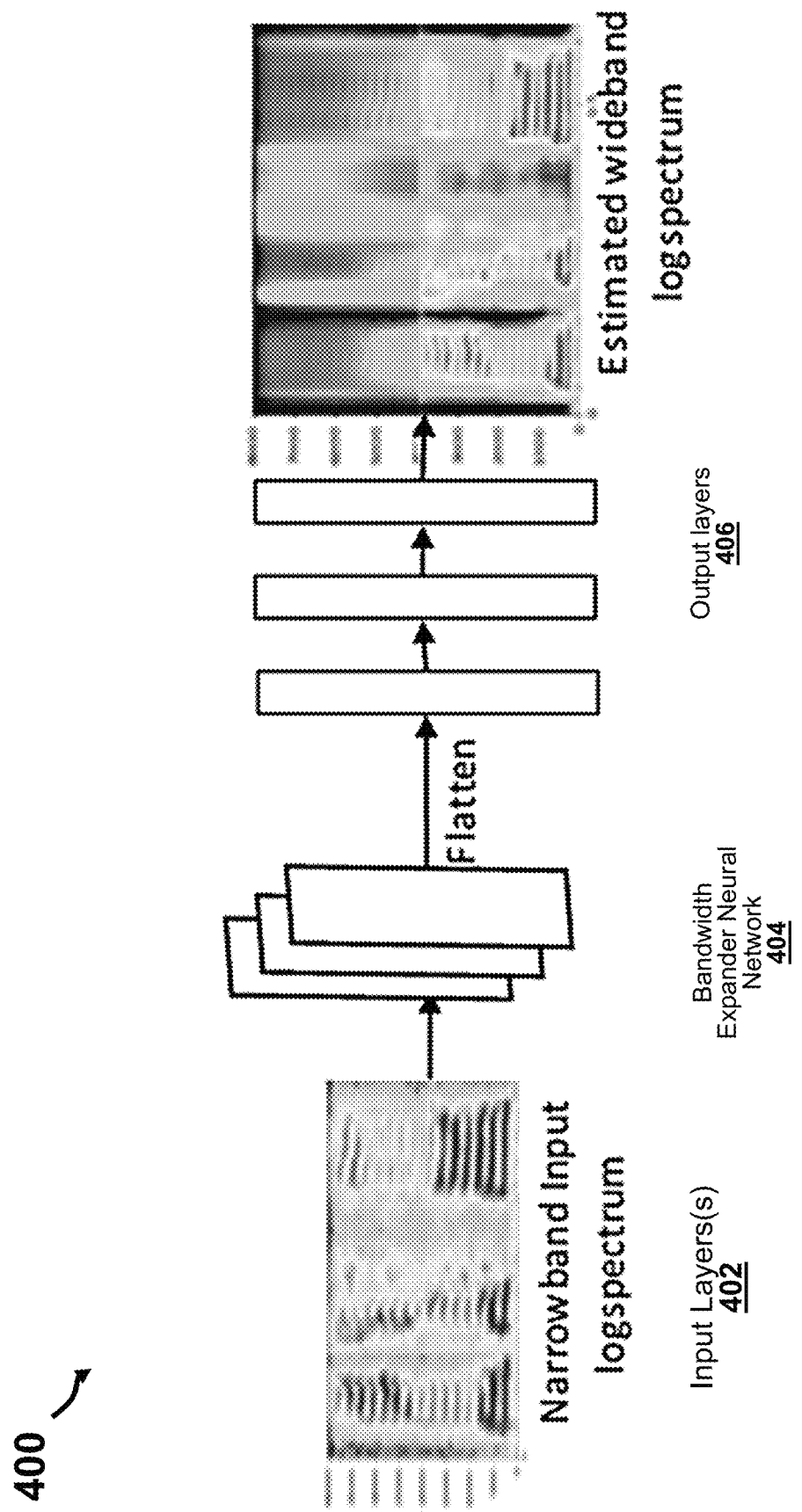
FIG. 4 shows layers of a neural network architecture for bandwidth expansion.

FIG. 4 shows layers of a neural network architecture 400 for bandwidth expansion. A server comprises machine-readable software programming to execute the various layers of the neural network 400, though the neural network 400 may be executed by any computing device comprising software and hardware (e.g., processor) capable of performing the operations of the neural network 400. Moreover, the layers of the neural network architecture 400 may be executed by any number of such computing devices. The layers of the neural network 400 include input layers 402, one or more bandwidth expansion neural network layers (sometimes called a bandwidth expander 404), and one or more output layers 406 to output estimated wideband signals. In operation, the input layers 402 perform various operations for ingesting input audio signals (e.g., training audio signals, enrollment audio signals, inbound audio signals), pre-processing the input audio signals, and/or performing various data augmentation operations on the input audio signals. The layers of the bandwidth expander 404 and the output layers 406 generate estimated wideband audio signals corresponding to the narrowband input audio signals and train the layers of the neural network architecture 400 according to various loss functions or other operations.

The input layers 402 comprise one or more layers for ingesting the input audio signals, pre-processing the input audio signals, and/or performing the data augmentation operations on the input audio signals. The input audio signals may be, for example, raw audio files or data streams, or pre-processed audio data (e.g., spectral representations, spectrograms, the features of the spectrogram) according to one or more pre-processing operations. The input layers 402 may perform one or more pre-processing operations on the audio inputs (e.g., raw audio input, spectral-temporal features).

As an example, the input layers 402 of the neural network architecture 400 ingests a raw audio input, the input layers 402 extract the spectral-temporal features and generate a frequency-domain representation. The input layers 402 ingest the raw audio input, extract the features of the raw audio input, and execute a transform function (e.g., FFT, SFT) that transforms the extracted features from a time-domain representation into a frequency-domain representation. The audio input is then fed into functional layers defining the bandwidth expander 404. In some cases, the input layers 402 perform a normalization function on the input audio signals, to ingest and generate z-normalized narrowband log-spectrograms, representing the features of the input audio signals, which the input layers 402 evaluate and extract from the input audio signals. The features extracted from the spectrogram may have any number of dimensions according to user configurations. The input layers 402 forward these extracted features to the convolutional layers of the bandwidth expander 404, which ultimately flatten and forward the features to the output layers 406.

In some cases, where the raw audio file originates via a communications channel configured for (and that generates audio signals having) a relatively wide bandwidth (e.g., 16 kHz), the input layers 402 can down-sample or execute a codec on the raw audio file to produce a corresponding simulated narrowband audio signal. Likewise, in some cases, the input layers 402 can perform up-sampling techniques or execute a codec on a narrowband raw audio file to produce a corresponding simulated wideband audio signal.

The bandwidth expander 404 comprises any number of neural network layers of any type of neural network, such as convolutional neural network (CNN) or deep neural network (DNN) coupled to the various output layers 406, which may include feed-forward layers, full-connected layers, loss layers, and normalization or de-normalization layers, among other potential layers. The bandwidth expander 404 may, for example, comprise a 1-D CNN layer followed by 3 feed-forward layers of the output layers 406. The CNN layer of the bandwidth expander 404 applies a number of filters and kernel size according to the expected features of the input audio signals (e.g., 64 filters, kernel size 5). The feed-forward layers likewise comprise a number of nodes for each layer as required by the audio signals (e.g., 1024 nodes per feed-forward layer).

During the training operational phase, the bandwidth expander 404 generates predicted estimated wideband signals. For example, the server applies the layers of the bandwidth expander 404 on a training narrowband signals to predict a 257-dimensional wideband z-normalized log-spectrum. The output layers 406 include layers of the neural network architecture 400 that perform various functions for training, tuning, or developing the bandwidth expander 404, among other layers of the neural network architecture 400. The output layers 406 trains the bandwidth expander 404 by executing, for example, a mean-squared error loss function that determines the distances between the features of the predicted estimated wideband signal and the features of an expected (or actual) wideband signal, as indicated by labels associated with the particular input audio signal. The output layers 406 may perform any number of additional or alternative operations to train or tune the output layers 406 based on these distances.

During the deployment operational phase, the input layers 402 receive an inbound audio signal, which may include converting a raw audio signal into spectral representation, extracting features of the audio signal, and various additional or alternative operations. For example, the input layers 402 may perform up-sampling of a codec-distorted narrowband inbound audio signal (e.g., computer file or data stream containing raw audio). The input layers 402 may forward some or all of the features (e.g., only features of the lower-half of the inbound spectrogram) to the bandwidth expander 404 for extracting the corresponding bandwidth-expanded spectrum. The convolutional layers of the bandwidth expander 404 generate an estimated wideband signal (e.g., 257-dimensional spectrogram) based upon the features of the inbound spectrogram received from the input layers input layers 402, and flatten the features of the estimated wideband spectrogram.

The output layers 406 perform various operations on the features of the estimated wideband dimensional spectrogram produced by the bandwidth expander 404. For example, the output layers 406 may include various statistics layers that calculate various log-spectral mean and/or variance statistics of the features of the input narrowband signal in order to de-normalize the estimated wideband signal generated by the bandwidth expander 404. The output layers 406 may perform any number of additional or alternative operations to, for example, normalize or de-normalize the estimated wideband signal with the input audio signal's spectrum, and/or calculate various statistics or variances for tuning/development, among other potential operations.

The output layers 406 may further extract the features of the estimated wideband signal generated by the bandwidth expander 404. Ultimately, the features of the estimated wideband signal may be used for training purposes or provided to any number of downstream applications. In some embodiments, for example, the features of the estimated wideband signal are ingested as inputs by an embedding extractor neural network for speaker verification and authentication operations.

Example Neural Network Architecture for Speaker Recognition

Figure 5:
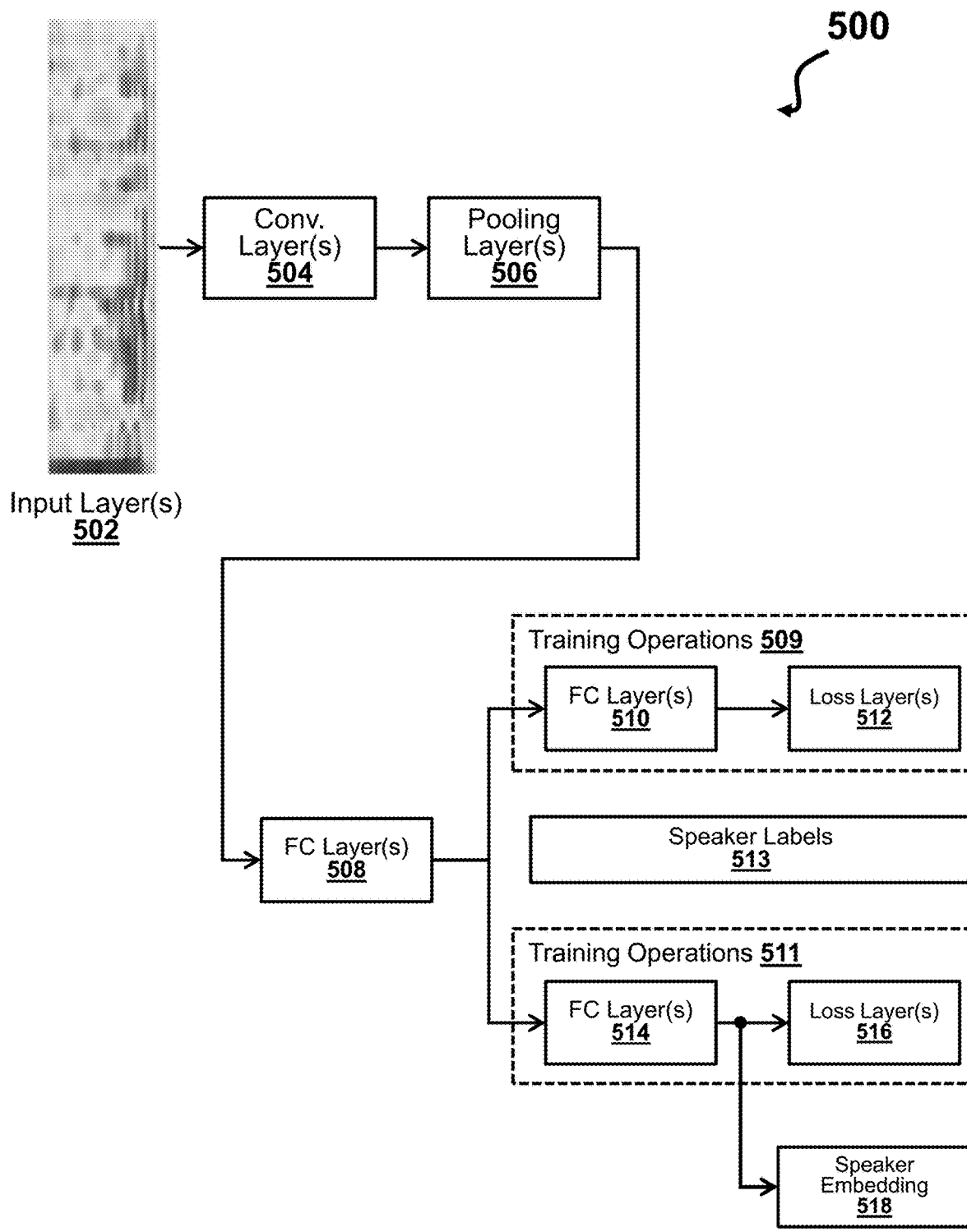
FIG. 5 shows layers of a neural network architecture for speaker recognition.

FIG. 5 shows layers of a neural network architecture 500 for speaker recognition. The neural network 500 is an end-to-end system that ingests and processes audio data of an input audio signal. In some embodiments, the neural network 500 includes in-network augmentation layers (not shown) that selectively apply data augmentation techniques on the ingested audio data during the various operational phases (e.g., training phase, enrollment phase, deployment phase). As such, the input audio signals mentioned in FIG. 5 could refer to training audio signals (e.g., clean audio signals, simulated audio signals), enrollment audio signals, or inbound audio signals. Embodiments may include additional or alternative operations, or may omit operations, from those shown in FIG. 5, and still fall within the scope of this disclosure. In addition, embodiments may vary the order components of the neural network 500 are executed.

The server enables or disables certain layers of the neural network architecture 500 based upon the needs of the particular operational phase and according to user configurations. For example, some or all of the augmentation layers of the input layers 502 could be enabled during training or enrollment, and disabled during deployment.

Input layers 502 comprise any number of layers for ingesting input audio signals and performing various pre-processing and/or data augmentation data operations. Any of the layers may be capable of performing pre-processing techniques when ingesting the input audio signal or features of the input audio signals. These pre-processing techniques may include, for example, performing a bandwidth expansion operation, parsing the audio data into fixed frames or sub-frames, transforming the audio data from a time-domain representation into a frequency-domain representation according to an FFT of SFT algorithm, and performing normalization or scaling functions. For example, certain pre-processing operations often normalize or scale the transformed energy values to a scale having a range of [−1, 1], where −1 is extreme low and 1 is extreme high.

One or more convolutional layers 504 ingest the various outputs of the input layers input layers 502, which may include the features extracted from the input audio signals. In some cases, these input audio signals are manipulated due to various pre-processing and/or data augmentation operations performed by the input layers 502. In some cases, convolutional layers 504 further ingest additional inputs from other data sources, such as training audio signals or simulated audio signals generated by the server memory or received from a database. The convolutional layers 504 include, for example, a 1-D convolutional layer or a SincNet layer. The convolutional layers 504 outputs the features generated to various pooling layers 506, which may include any number of statistics layers and/or normalization layers. Fully connected layers 508 perform various weighted operations on the results ingested from the stat pooling layers 506 to generate a feature vector (e.g., training feature vector, enrollment feature vector, training feature vector) for the inputted audio signal.

The training phase for the neural network architecture 500 may include two sub-phase: first-phase training operations 509 and second-phase training operations 511. For the first-phase training operations 509, the server may freeze various hyperparameters and/or disable certain layers (e.g., layers of the second-phase training operations 511). The fully-connected layers 510 of the first-phase training operations 509 ingest the outputs from the fully-connected layers 508 and similarly perform various weighted operations on the results ingested from the fully-connected layers 508 to generate lower-dimensional feature vector. Loss layers 512 of the first-phase training operations 509 perform a softmax and/or cross-entropy operation, which in some implementations reference speaker labels 513 corresponding to the inputted audio signals. The loss layers 512 may adjust various parameters in the layers of the neural network architecture 500 based on the particular loss function performed.

For the second-phase training operations 511, the server may freeze various hyperparameters and/or disable certain layers (e.g., layers of the first-phase training operations 509) and re-feed the input audio signals through the neural network architecture 500. The fully connected layers 514 of the second-phase training operations 511 perform various weighted operations on the feature vector ingested from the fully-connected layers 508 to generate another lower-dimensional feature vector for the particular inputted audio signal. The loss layers 516 of the second-phase training operations 511 perform a large margin cosine loss (LMCL) function, which in some implementations references the speaker labels 513 corresponding to the particular inputted audio signals. In some cases, the loss layers 516 may adjust various parameters in the layers of the neural network architecture 500 based on the LMCL.

During deployment, the fully-connected layers 514 and loss layers 516 are enabled. The feature vector generated by the fully-connected layers 514 becomes the speaker embedding extracted and referenced for speaker verification. The loss layers 516 operations are used to score the distance and similarity between expected or enrolled embeddings and the speaker embedding extracted for an inbound audio signal received at deployment. The inbound speaker of inbound audio signal is verified as an expected or an enrollee when the loss layers 516 determines that a similarity score or distance between the inbound speaker embedding and the expected or enrollee embedding is within a threshold similarity score or distance.

Neural Network for Bandwidth Expansion and Speaker Recognition

Figure 6A:
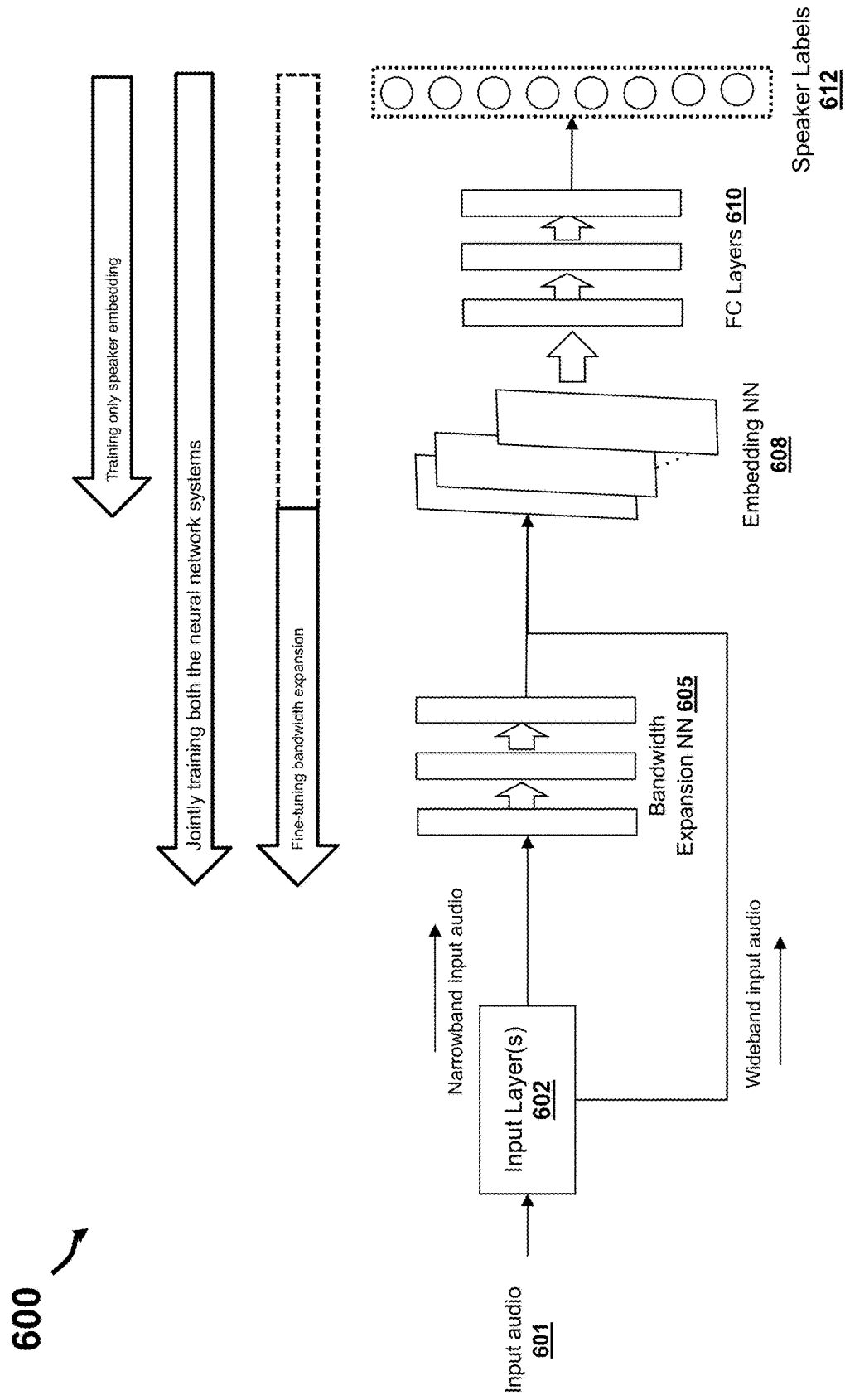
FIG. 6A shows layers of a neural network architecture for bandwidth expansion and speaker recognition.

FIG. 6A shows layers of a neural network architecture 600 for bandwidth expansion and speaker recognition. The neural network architecture 600 ingests and processes audio data of input audio signals 601 (e.g., training signals, enrollment signals, inbound signals) received during various operational phases (e.g., training phase, enrollment phase, deployment phase). The neural network architecture 600 comprises layers for a speaker embedding extractor 608 and a bandwidth expander 605. The following description for FIG. 6A pertains to training operations for generating and evaluating mixed-bandwidth speaker embeddings. Embodiments may include additional or alternative operations, or may omit operations, from those shown in FIG. 6A, and still fall within the scope of this disclosure. In addition, embodiments may vary the order that components of the neural network 600 are executed.

Input layers 602 of the neural network architecture 600 comprise any number of neural network layers for ingesting input audio signals 601, performing pre-processing operations, and/or performing data augmentation operations. The input layers 602 determine the bandwidth of the input audio 601 based upon the channel through which the input audio 601 was received according to various pre-configurations or based upon evaluating the characteristics or features of the input audio 601. The input layers 602 routes narrowband input audio signals 601 to the layers of the bandwidth expander 605 and routes wideband input audio signals 601 directly to the layers of the embedding extractor 608, bypassing the bandwidth expander 605.

The layers of the bandwidth expander 605 ingest the narrowband audio signal and generate an estimated wideband signal according to the various processes described herein. The bandwidth expander 605 outputs features of the estimated wideband signal for the layers of the embedding extractor 608. The embedding extractor 608 ingests any number of wideband signals, which may be the wideband input signals 601 received directly from the input layers 602 or the estimated wideband signals generated by the bandwidth expander 605. The embedding extractor 608 performs various operations to extract speaker embeddings for the speakers of the input audio signals 601.

The fully-connected layers 610 reduce the dimensions of the feature vectors produced by the embedding extractor 608 and may further perform, for example, various statistics computation or pooling operations, loss functions, and classifications. The various operations performed by the fully-connected layers 610 reference speaker labels 612 associated with the input audio signals 601 to determine the amount of error in the embeddings and/or classifications produced by the embedding extractor 608.

The loss layers further perform various loss functions that adjust or tune to any number of hyperparameters of the neural network architecture 600. The loss functions may adjust the hyperparameters of the bandwidth expander 605, the embedding extractor 608, and/or the fully-connected layers 610 in order to improve the quality of the estimated wideband signals generated by the bandwidth expander 605 and/or improve the feature vectors and speaker embeddings extracted by the embedding extractor 608 and fully-connected layers 610.

In some embodiments, the server need only train the embedding extractor 608. In such embodiments, the server previously trained the bandwidth expander 605 and fixed the hyperparameters of the bandwidth expander 605. The server may also disable one or more layers of the neural network architecture 600 used for training the bandwidth expander 605. The layers of the embedding extractor 608 and fully-connected layers 610 are trained on the estimated wideband signals (generated by the bandwidth expander 605) and the wideband audio inputs 601 (routed directly from the input layers 602).

In some embodiments, the server jointly trains the bandwidth expander 605 and the embedding extractor 608. The input audio signals 601 may have various bandwidths, where the input layers 602 routes the narrowband input audio signals 601 to the bandwidth expander 605. The embedding extractor 608 and the fully-connected layers 610 extract the embeddings for the input audio signals 601 and determine the level of error in the extracted embeddings. The speaker labels 612 may indicate the expected bandwidth or type of bandwidth for the particular input audio signals 601, the expected embedding or features, and various other information about the input audio signals 601. The neural network architecture 600 back-propagates the level of error or speaker classification errors through the bandwidth expander 605 and the embedding extractor 608, which includes adjusting various hyperparameters and re-applying the neural network architecture 600 on the input audio signals 601.

In some embodiments, server fine-tunes the bandwidth expander 605 based on the outputs of the embedding extractor 608. The server fixes the embedding extractor 608 and fine-tunes the parameters of the bandwidth expander 605 according to the speaker classification errors generated by the embedding extractor 608.

In some embodiments, the server need only fine-tune the bandwidth expander 605. In such embodiments, the server previously trained the embedding extractor 608 and fixed the hyperparameters of the embedding extractor 608. The server may also disable one or more layers of the neural network architecture 600 used for training the embedding extractor 608. The bandwidth expander 605 generates estimated wideband signals that are ingested by the trained embedding extractor 608. The embedding extractor 608 and the fully-connected layers 610 extract the embeddings for the input audio signals 601 and determine the level of error in the extracted embeddings. The speaker labels 612 indicate the expected embedding or features, and various other information about the input audio signals 601. The bandwidth expander 605 is fine-tuned according to level of error or speaker classification errors generated by the embedding extractor 608. The neural network architecture 600 back-propagates the level of error or speaker classification errors through the bandwidth expander 605, which includes adjusting the hyperparameters of the bandwidth expander 605 and re-applying the neural network architecture 600 on the input audio signals 601.

Neural Network for Bandwidth Expansion and Dual-Embeddings

Figure 6B:
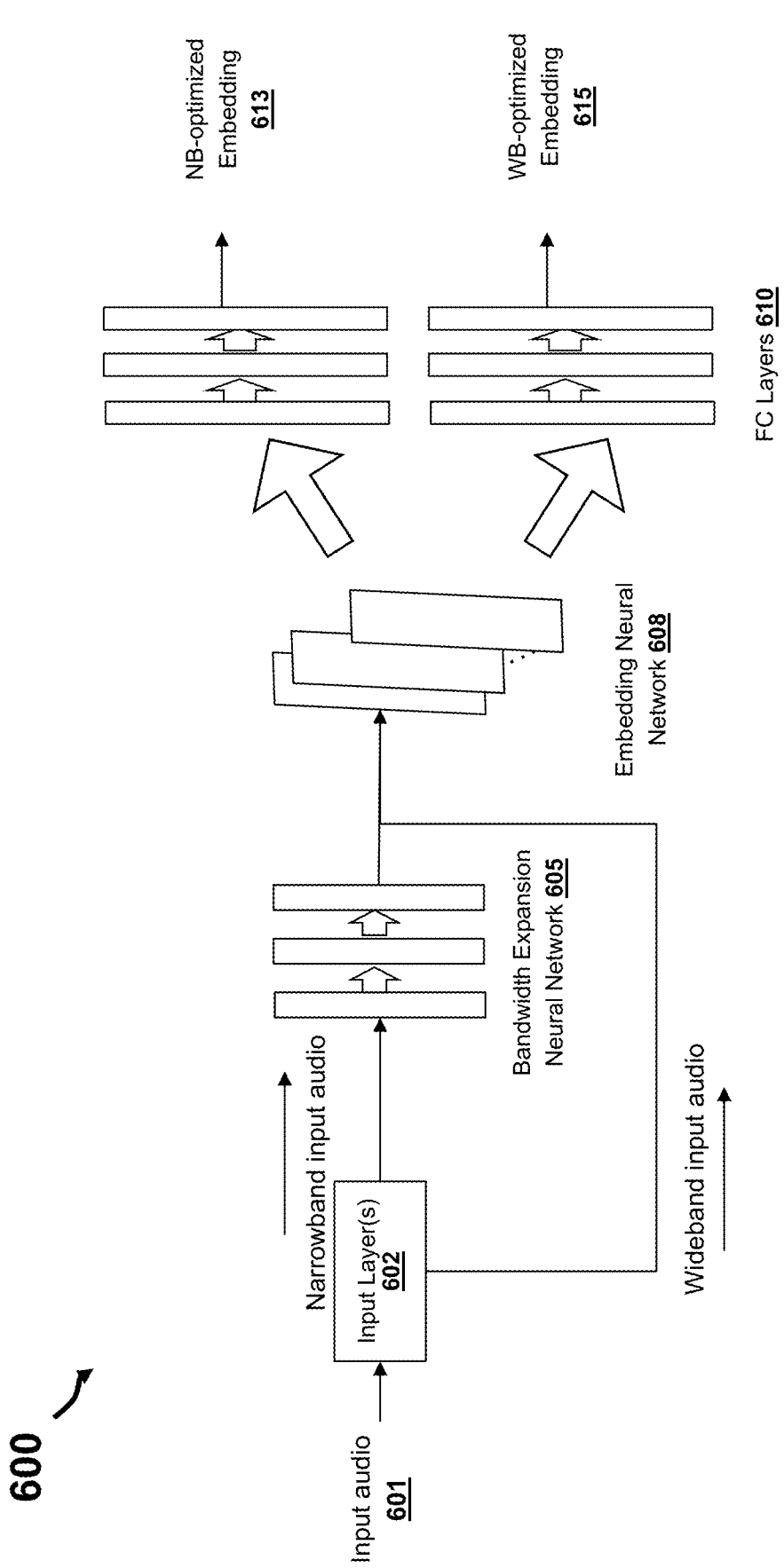
FIG. 6B shows the layers of the neural network architecture for bandwidth expansion and speaker recognition.

FIG. 6B shows the layers of the neural network architecture 600 for bandwidth expansion and speaker recognition, where the neural network architecture 600 is trained to extract and evaluate dual-embeddings that are optimized for narrowband signals and wideband signals. These operations are performed when the server completes training the bandwidth expander 605 and/or the embedding extractor 608.

When the bandwidth expander 605 and the embedding extractor 608 are trained (as described in FIG. 6A) the server fixes the models (e.g., hyperparameters) of the bandwidth expander 605 and embedding extractor 608. The server also disables any layers used for training the bandwidth expander 605 and embedding extractor 608. In this way, the server freezes the bandwidth expander 605 and the embedding extractor 608, and trains only the fully-connected layers 610.

During the training phase, the server may perform two training sub-phases to separately fine-tune the fully-connected layers 610. The fully-connected layers 610 are then trained to extract two different types of embeddings: an embedding optimized for narrowband audio (the narrowband embedding 613) and an embedding optimized for wideband audio (wideband embedding 615). The loss functions of the neural network architecture 600 adjust the hyperparameters of the fully-connected layers 610 according to the particular training sub-phase. In some implementations, when training the fully-connected layers 610 for extracting the narrowband-optimized embedding 613, the input audio signals may include narrowband signals that bypass the bandwidth expander 605. And in some implementations, the fully-connected layers 610 are trained only on wideband signals or estimated wideband signals (generated by the bandwidth expander 605). During the deployment phase, the neural network architecture 600 extracts both types of optimized embeddings 613, 615, regardless of the type of bandwidth of an inbound input audio 601 (e.g., narrowband or wideband).

Cross-Channel Enrollment and Authentication Operations

Figure 7:
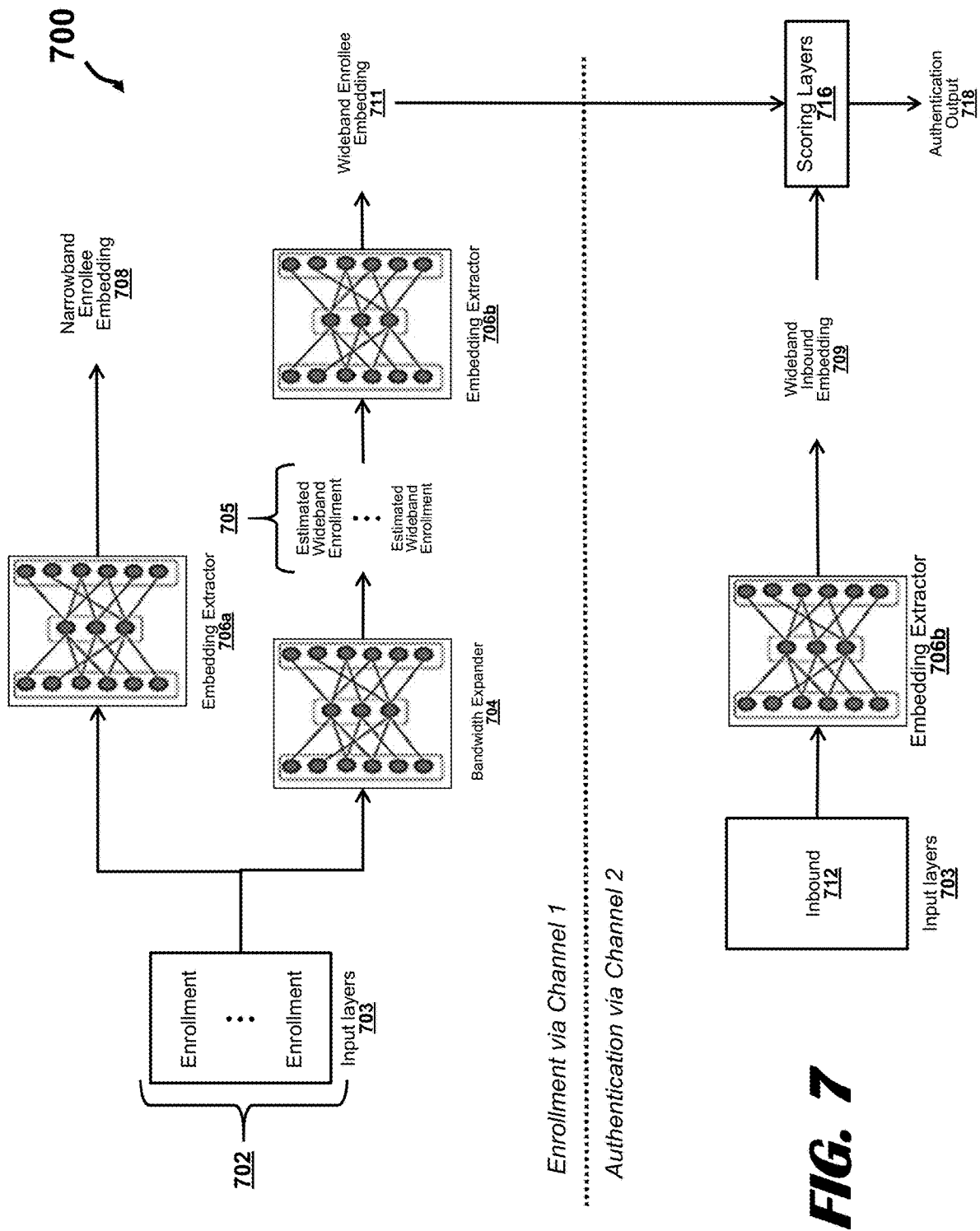
FIG. 7 shows layers of a neural network architecture for speaker and authentication across multiple channels.

FIG. 7 shows layers of a neural network architecture 700 for speaker and authentication across multiple channels. The neural network 700 is described as being executed by a server during enrollment and deployment operational phases for authentication, though the neural network 700 may be executed by any computing device comprising a processor capable of performing the operations of the neural network 700 and by any number of such computing devices. The neural network 700 includes input layers 703 for ingesting audio signals 702, 712 and performing various augmentation operations; layers that define a bandwidth expander 704; layers that define an embedding extractor 706 for generating speaker embeddings 708, 709 (e.g., voiceprints); and one or more scoring layers 716 that perform various scoring operations, such as a distance scoring operation, to produce an authentication score 718 or other similar determination.

In some embodiments, the neural network architecture 700 comprises one embedding extractor 706 for extracting narrowband and wideband embeddings. In some cases, certain layers of the embedding extractor 706 are trained for generating optimized narrowband and wideband embeddings for narrowband input signals or wideband input signals. Alternatively, in some embodiments, the neural network architecture 700 comprises a narrowband embedding extractor 706a and a wideband embedding extractor 706b. The narrowband embedding extractor 706a includes layers trained for generating optimized narrowband embeddings. Similarly, the wideband embedding extractor 706b includes layers trained or generating optimized wideband embeddings.

During an enrollment phase, an enrollee-speaker contacts a service provider's system and supplies several example enrollee audio signals 702 through a first channel, which operates according to a narrow bandwidth. For example, the speaker responds to various questions or prompts with spoken responses that serve as the enrollee audio signals 702, where the service provider system presents the questions or prompts to the enrollee by an IVR system or by a human agent of the service provider system. The server receives the enrollee's spoken responses as the narrowband enrollee audio signals 702. The server feeds the resulting narrowband enrollee signals 702 into the neural network architecture 700, which applies a narrowband embedding extractor 706a on the enrollee audio signals 702 to extract a narrowband enrollee embedding 708 for the enrollee. The server stores the narrowband enrollee embedding 708 into a database or other non-transitory storage medium for later reference during authentication. The server references the narrowband enrollee embedding 708 to authenticate future inbound audio signals received through the first channel (or other narrowband channel).

The server also generates a wideband enrollee embedding 711 based upon the narrowband enrollee audio signals 702. The neural network architecture 700 feeds each of the enrollee audio signals 702 into the bandwidth expander 704 to generate one or more corresponding estimated wideband enrollee signals 705. The neural network architecture 700 feeds the estimated wideband enrollee signals 705 into the wideband embedding extractor 706b to extract a wideband enrollee embedding 711 for the enrollee. The server stores the wideband enrollee embedding 711 into the database or other non-transitory storage medium. The server references the wideband enrollee embedding 711 to authenticate future inbound audio signals 712 received through a second communications channel that operates according to the wide bandwidth.

The server feeds the audio signals 702, 712 to the input layers 703 to begin applying the neural network 700. In some cases, the input layers 703 perform one or more pre-processing operations on the audio signals 702, 712, such as parsing the audio signals 702, 712 into frames or segments, extracting low-level features, and transforming the audio signals 702, 712 from a time-domain representation to a frequency-domain (or energy domain) representation, among other pre-processing operations.

During the enrollment phase, the input layers 703 receive the enrollment audio signals 702 for the enrollee. In some implementations, the input layers 703 perform data augmentation operations on the enrollment audio signals 702 to, for example, manipulate the audio signals within the enrollment audio signals 702, manipulate the low-level features, or generate simulated enrollment audio signals 702 that have manipulated features or audio signal based on corresponding enrollment audio signals 702.

During the deployment phase, the input layers 703 may perform the pre-processing operations to prepare an inbound audio signal 712 for the embedding extractor 706 or, in some implementations, the wideband embedding extractor 706b. The server, however, may disable some or all of the pre-processing and/or augmentation operations of the input layers 703, such that the embedding extractor 706 evaluates the features of the inbound audio signal 712 as received.

The embedding extractor 706 comprises one or more layers of the neural network 700 trained (during a training phase) to detect speech and generate feature vectors based on the features extracted from the audio signals 702, 712, which the embedding extractor 706 outputs as embeddings 708, 711, 709. During the enrollment phase, the embedding extractor 706 produces a feature vector for each of the enrollment audio signals 702. The neural network 700 then performs various statistical or algorithmic operations to combine each of the feature vectors and extract the enrollee embeddings 708, 711. For example, the neural network architecture 700 may include the narrowband embedding extractor 706a and wideband embedding extractor 706b. The narrowband embedding extractor 706a generates feature vectors corresponding to each of the narrowband enrollee audio signals 702 and extracts the narrowband enrollee embedding 708 representing an average of the narrowband feature vectors. The wideband embedding extractor 706b similarly generates wideband feature vectors corresponding to each of the estimated wideband enrollee signals 705 and extracts the wideband enrollee embedding 711 representing the average of the wideband feature vectors.

During the deployment phase, the embedding extractor 706 (or wideband embedding extractor 706b) ingests the features of the inbound audio signal 712 having the wide bandwidth employed by the second communications channel. The embedding extractor 706 generates the feature vector based upon the inbound audio signal 712 received through the second channel, which the embedding extractor 706 outputs as an inbound wideband embedding 709 for the inbound audio signal 712.

To authenticate the inbound speaker of the inbound audio signal 712, the neural network 700 feeds the wideband enrollee embedding 711 and the inbound wideband embedding 709 into the scoring layers 716 of the neural network architecture 700 to perform various scoring operations. The scoring layers 716 perform a distance scoring operation that determines the distance (e.g., similarities, differences) between the wideband enrollee embedding 711 and the inbound wideband embedding 709, indicating the likelihood that the inbound speaker is the enrollee. For instance, a lower distance score (or higher similarity score) for the inbound signal 712 indicates more similarities between the wideband enrollee embedding 711 and the inbound wideband embedding 709, yielding a higher-likelihood that the inbound speaker is the enrollee. The neural network architecture 700 may generate and produce an authentication output 718 based upon the scoring operations. The authentication output 718 may be a value generated by the scoring layers 716 based on one or more scoring operations (e.g., distance scoring), visual indicator for a GUI, and/or instructions or data for a downstream application.

In some implementations, the scoring layers 716 determine whether the distance score or other outputted values satisfy threshold values. In such implementations, the authentication output 718 need not be a numeric output. For example, the authentication output 718 may be a human-readable indicator (e.g., plain language, visual display) that indicates whether the neural network architecture 700 has authenticated the inbound speaker. Additionally or alternatively, the authentication output 718 may include a machine-readable detection indicator or authentication instruction, which the server transmits via one or more networks to computing devices performing one or more downstream applications.

Example of Multi-Channel Authentication with Local Authentication

Figure 8:
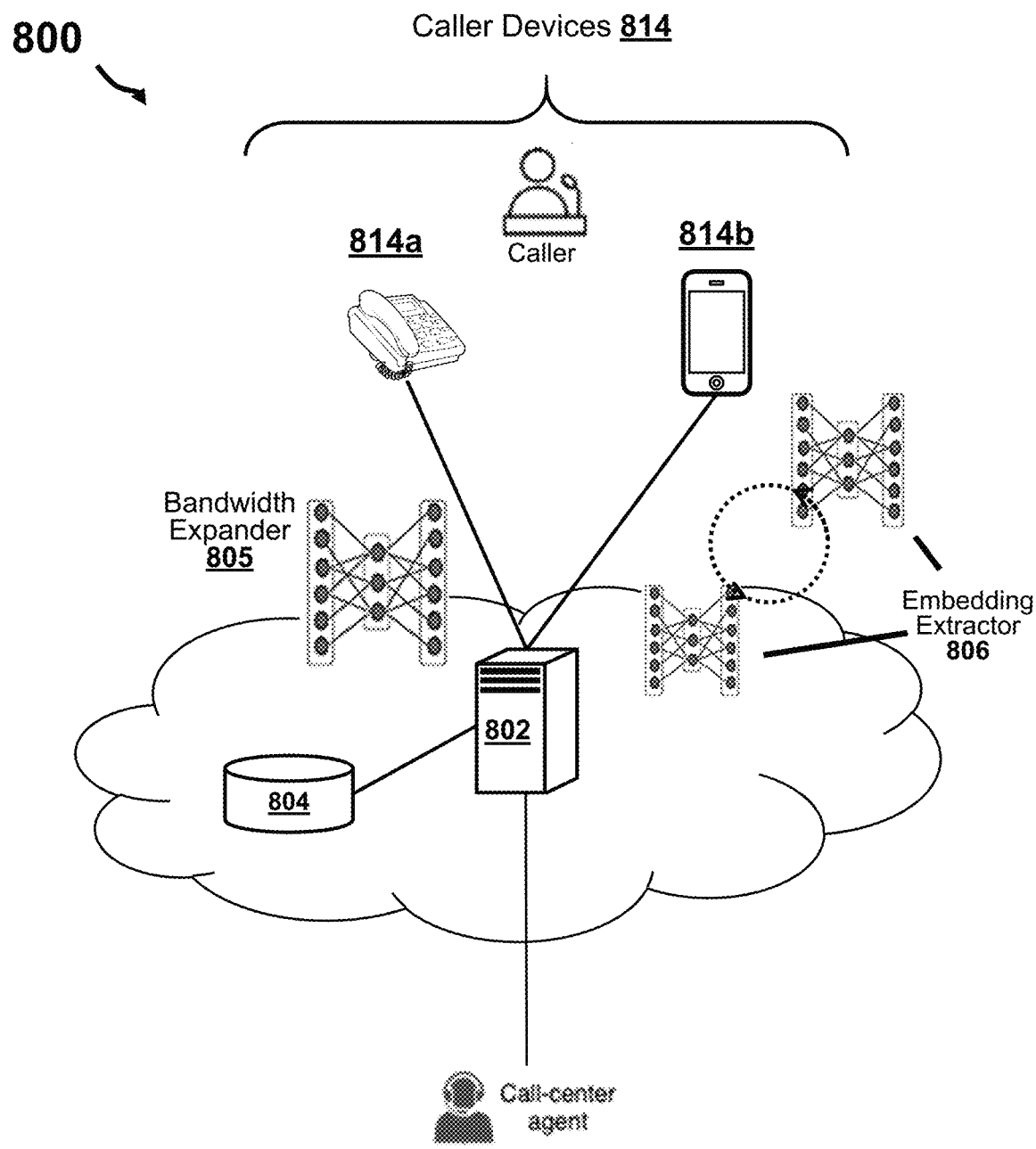
FIG. 8 shows a system for cross-channel caller authentication that employs a neural network architecture according to an embodiment.

FIG. 8 shows a system 800 for cross-channel caller authentication that employs a neural network architecture according to an embodiment. The system 800 comprises an authentication server 802, an authentication database 804, and caller devices 114. Embodiments may comprise additional or alternative components or omit certain components from those of FIG. 8, and still fall within the scope of this disclosure. Moreover, embodiments may include or otherwise implement any number of devices capable of performing the various features and tasks described herein. For example, the FIG. 8 shows the authentication server 802 in as a distinct computing device from the analytics database 804. In some embodiments, the analytics database 804 may be integrated into the analytics server 802. It should be appreciated that many of the details regarding the hardware, software, and variations thereof have been described previously (e.g., FIG. 1), and that such details need not be repeated here but remain within the scope contemplated for FIG. 8.

A caller may contact a service provider's call center through various communications channels. The communications channels include hardware and software components configured to receive voice inputs and other data from the caller, which various devices capture from the communications channel and forward to the authentication server 802 or that the call center agent forwards to the authentication server 802.

The communications channels host, process, and capture input audio signals from the caller devices 814. Each communication channel is configured to operate at a particular bandwidth, whereby the audio input signals produced and forwarded to the authentication server 802 contain raw audio files or data streams having the particular bandwidth. For example, a landline telephone 814a communicates with the provider service through a telephony channel that produces input audio signals having an 8 kHz bandwidth. As another example, a smartphone 814b (or edge device) may execute a software application that communicates with the provider service through a computing network channel for the software application that produces input audio signals having a 16 kHz bandwidth.

The authentication server 802 (or other computing device of the provider system) executes software programming to process and authenticate the input audio signals by applying the neural network architecture, which may be stored in an authentication database 804. The neural network architecture includes a bandwidth expander 805 and an embedding extractor 806.

During an enrollment process, the caller-enrollee need only provide a series of enrollee audio signals to the provider's system. The authentication server 802 applies the embedding extractor against the enrollee audio signals to extract an enrollee embedding for the caller-enrollee. The authentication server 802 then stores the enrollee embedding into the authentication server 804 for later reference.

In some embodiments, the authentication server 802 may receive and detect low-bandwidth enrollment signals when the caller communicates the enrollment signals to the authentication server 802 via the first communication channel (e.g., low-bandwidth phone channel) using a landline phone 814a. The authentication server 802 may apply the bandwidth expander 805 to improve the quality of the inbound signal. The authentication server 802 need not apply the bandwidth expander 805 to high-bandwidth enrollment signals received from smartphone 814b via the second communication channel.

The authentication server 802 is in constant or periodic network communication with the application of the smartphone 814b. The authentication server 802 or the smartphone 814b may exchange queries or push notifications via the computing network (e.g., Internet) regarding updates to the enrollee embedding. The smartphone 814b downloads the enrollee embedding in response to detecting changes to the enrollee embedding or at pre-configured intervals.

In some embodiments, the application on the smartphone 814b includes the embedding extractor 806 neural network, which the application applies to the voice inputs during the enrollment and/or deployment phases. The smartphone 814b may generate or update the enrollee embeddings by applying the embedding extractor 806 to a series of enrollment audio signals provided by the caller-enrollee. In this way, the smartphone 814b generates the enrollee embedding locally and uploads the enrollee embedding to the authentication database 804.

To authenticate an inbound caller as the caller-enrollee, the authentication server 802 or the application of the smartphone 814b applies the embedding extractor 806 to inbound audio signals. When the caller communicates with the call-center agent through the first communication channel (e.g., low-bandwidth phone channel) using the landline phone 814a, the authentication server 802 detect the low-bandwidth inbound signal and applies the bandwidth expander 805 to improve the quality of the inbound signal. The authentication server 802 then retrieves the enrollee embedding from the authentication database 804, applies the embedding extractor 806 against the inbound audio signal to extract an inbound embedding, and determines the distance between the inbound embedding and the enrollee embedding. The authentication server 802 need not apply the bandwidth expander 805 to high-bandwidth enrollment signals received from the smartphone 814b via the second communication channel, so the authentication server may proceed to applying the embedding extractor 806 and authenticating the inbound caller.

In some embodiments, the application of the smartphone 814b locally applies the embedding extractor to the inbound audio signals. When the caller selects a GUI option to contact the caller-center agent via the second communication channel, the smartphone prompts the caller for authenticating voice biometrics or otherwise triggers the authentication software routines. The smartphone 814b retrieves the enrollee embedding from local memory of the smartphone 814b or from the authentication database 804, applies the embedding extractor 806 against the inbound audio signal to extract an inbound embedding, and determines the distance between the inbound embedding and the enrollee embedding. If authentication is successful, then the smartphone 814b may transmit a confirmation instruction or other security token to the authentication server 802, indicating that the inbound caller is successfully authenticated as the enrollee.

Additional Example Embodiments

Speaker Enrolls Voice on Cloud Based Application

In some embodiments, a caller device transmits voice communications to a service provider's system, which captures and transmits the communications data to a cloud platform (e.g., one or more servers) of an authentication service. The service provider's system includes various computing devices (e.g., agent device) that upload the communications data to a cloud-based application hosted by the authentication service. The caller's device executes a software application or web-based application associated with the authentication service, which allows the caller device to offload embedding extraction and other operations to the authentication service's cloud platform. Some examples of the cloud platform include custom web application and call-center IVR.

The caller's voice is passively/automatically enrolled with the authentication service the first time that the caller contacts the service provider and/or the authentication service or actively enrolled in response to a request from the one of the services or the caller. An example of such operations may be found, for example, in FIG. 6B.

In some embodiments, the caller opens a cloud-based software application on a computing device and triggers a request for the caller to input voice data (e.g., instructs the edge device to communicate with the service provider). The web-application streams the audio signal to the provider's computing device or directly to the authentication service's servers. An authentication server detects the characteristics of the inbound audio signal, such as sample rate or encoding format, and performs preprocessing to obtain the highest bandwidth possible of the speech signal by, for example, applying a bandwidth expansion neural network on the inbound audio signal. The authentication server then applies an embedding extractor neural network on the inbound audio signal to enroll and/or authenticate the caller. The caller may perform multiple interactions with the provider service and/or authentication service to update an enrollee embedding, which is stored in a database to uniquely identify the speaker in the future.

Speaker Enrolls Voice on Edge Device

In some embodiments, a caller uses an edge-device (or other IoT device) to perform requests using voice. Non-limiting examples of the edge device may include an embedded device with in-built microphone integrated into a television remote, a smartphone, personal voice assistant, and automobile dashboard assistant, among others. Edge devices are typically used to perform heavy processing of data on the device itself, without requiring raw personal information to be streamed to the cloud. In such embodiments, the edge device and an authentication server cross-compile the same "speaker embedding extractor" software used in a cloud solution to run on the edge device.

The caller interacts with an edge device using voice to perform a task. The application provided by an identity service runs on the edge device and detects a need for voice enrollment the first time that the caller communicates using the device or in response to an active enrollment request from the identity service or the caller. The edge device locally executes a speech embedding extraction neural network of the identity service using the highest possible bandwidth signal available through the device according to a bandwidth expansion neural network, executed at the edge device or at an authentication server. The caller may perform multiple interactions to update the enrollee speaker embedding, which the edge device uploads to a cloud data of the identity service, which the authentication server references to authenticate the caller via other channels.

Speaker Enrolls Voice by Calling into Identity Provider's Call-Center or IVR

In some cases, the speech signal transferred over the phone channel is often going to be narrow bandwidth (0.3-3.4 kHz) sampled at 8 kHz. If narrow bandwidth audio is used to create speaker embeddings to enroll the speaker, there could be a mismatch between the embeddings extracted via wideband communications channels that provide wideband speech signals. As such, the speaker embeddings only work properly for similar channels where narrowband audio is preferred. This restricts the scope of cross-channel environments that an identity service can verify and authenticate.

A bandwidth expansion neural network may convert the phone channel low bandwidth speech signal into comparatively higher-quality wideband signal, prior to extracting the speaker embeddings and keep the speech bandwidth consistent across all narrowband and wideband channels.

To complete voice enrollment, a caller-enrollee places a call to an IVR or a call-center through a phone channel. An authentication server of the identity service applies a bandwidth expansion neural network on the call audio signal to convert the narrowband speech signal into a higher-quality wideband speech signal. The better quality audio helps improve the interactions with the call-center agent, as well as the embedding extractions. The authentication server applies the embedding extractor to the converted (estimated) wideband speech signal to extract speaker embeddings. Enrollee embeddings may be updated during the subsequent calls made the same speaker. The enrollee embeddings are stored in the identity provider's cloud database to uniquely identify the speaker by the identity provider for authenticating the speaker calling back into the call-center. The same enrollee embeddings can be requested or applied for audio signals received via any other channel supported by the identity provider, thereby assisting cross-channel authentication without requiring the enrollee to enroll again for each additional channel.

Consolidating Multi-Channel and Multi-Device Voice Enrollment

In some embodiments, an identity provider manages a unique speaker's identity across several channels. Each channel has different characteristics (e.g. type of microphone, type of audio encoding algorithm, channel's sample rate). In such embodiments, an authentication server consolidates speech signals from any channel into a target band speech signal. For instance, if the primary channel for authentication is the phone channel, then all enrollment speech data is treated as narrowband audio to create speaker embeddings. If the primary channel of authentication involves wideband audio, then all enrollment speech data is converted to wideband using a bandwidth expansion neural network. This gives the identity provider the ability to use inbound audio signals from any channel or device to enroll and authenticate the caller-enrollee across all channels.

When an authentication server of an identity provider generates a speaker enrollment embedding, the authentication server generates or updates the enrollment embedding with the latest timestamp. Any device that needs to update or reference the enrollment embedding queries the identity provider's cloud server database to determine whether the device has the latest version of the enrollment embedding. If outdated, the device requests the latest version of the enrollment embedding from the authentication server and updates the enrollment embedding locally, according to any new audio input signals. After updating the enrollment embedding locally, the device updates the enrollment embedding with the latest timestamp and uploads the enrollment embedding back to the database of the identity service, so that the enrollment embedding can be queried/delivered to any other channel or device.

Authenticating a Speaker on an Edge Device Application with Enrollment on the Phone Channel In some embodiments, a caller who has already enrolled their voice by calling into the identity provider's phone channel and, now, the speaker is using an edge device application for authentication. The edge-device transmits a request to a cloud server for the most recent enrollment embedding generated after applying a bandwidth expansion neural network on the caller's speech signal during the previous calls. The caller interacts with the application of the edge device using voice inputs, where the caller has previously enrolled the caller's voice through the phone channel by interacting with the IVR agent at the call-center. The edge device application queries a cloud database for a more recent enrollment embedding available in the identity provider's cloud database. The edge device then requests the most recent enrollment embedding to perform authentication processes (e.g., score prediction).

Authenticate Caller on Phone Channel with Enrollment on Edge Device

In some embodiments, software of an edge device uses wideband audio to generate an enrollment embedding that is used to authenticate an enrollee-caller via a phone channel. During authentication, the phone channel speech is processed by the bandwidth expansion neural network on an authentication server of the edge device, whereby the authentication server or edge device authenticates the telephone call by applying a speaker verification neural network against the enrollment embedding created on the edge device.

Reconstruct Wideband-Quality Audio for Narrowband Communication Channel

In some embodiments, a bandwidth expansion neural network is used to process a narrowband data stream signal in real-time and convert the audio data into wideband quality speech. The wideband quality helps improve the intelligibility and clarity of speech transferred over the narrowband channels. For example, the bandwidth expansion neural network can be deployed at the call-center agent's to help improve the incoming signal quality, helping the agent to better understand the caller. The bandwidth expansion neural network can also be deployed on an edge device used for incoming calls. For example, the bandwidth expansion neural network can be applied to caller's voice inputs to improve quality and reduce degradation (e.g., background noise) to help improve the caller's experience.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
   obtaining, by a computer, a plurality of training audio signals including one or more lower-bandwidth audio signals having a first bandwidth and one or more corresponding higher-bandwidth audio signals having a second bandwidth, wherein the first bandwidth is comparatively lower than the second bandwidth;
   training, by the computer, a bandwidth expander comprising a first set of one or more neural network layers of a neural network and an embedding extractor comprising a second set of one or more neural network layers of the neural network using a plurality of joint labels for joint training by:
      applying the neural network on the plurality of training audio signals and the plurality of labels associated with the plurality of training audio signals, wherein the plurality of labels indicate features of the plurality of training audio signals, and wherein the computer determines that the bandwidth expander is trained in response to determining that a level of error between a predicted feature vector extracted by the bandwidth expander and an expected feature vector indicated by one or more labels of a training audio signal satisfies a training threshold;
   receiving, by the computer, an inbound audio signal having the first bandwidth; and
   generating, by the computer, an estimated inbound audio signal having the second bandwidth by applying the bandwidth expander of the neural network on the inbound audio signal.

2. The method according to claim 1, wherein obtaining the plurality of training audio signals includes:
   generating, by the computer, a lower-bandwidth audio signal having the first bandwidth by executing a codec program on a higher-bandwidth audio signal having the second bandwidth.

3. The method according to claim 1, wherein obtaining the plurality of training audio signals includes:
   generating, by the computer, a simulated lower-bandwidth audio signal having a type of degradation by executing an augmentation operation for the type of degradation on a lower-bandwidth audio signal, the plurality of training audio signals further comprising the simulated lower-bandwidth audio signal, and
   wherein the inbound audio signal has the type of degradation, whereby the estimated inbound audio signal generated by the computer is an enhanced inbound audio signal having comparatively less of the type of degradation.

4. The method according to claim 1, further comprising:
   extracting, by the computer, one or more features from each of the training audio signals, wherein the computer applies the neural network on the one or more features of the training audio signals; and
   extracting, by the computer, the one or more features from the inbound audio signal, wherein the computer applies the neural network on the one or more features of the inbound audio signal.

5. The method according to claim 1, wherein at least one higher-bandwidth audio signal of the plurality of training signals originated via a channel configured for the second bandwidth.

6. The method according to claim 1, wherein the computer generates the estimated inbound audio signal, in response to the computer determining that the inbound audio signal originated via a channel configured for the first bandwidth.

7. The method according to claim 1, wherein training further comprises performing, by the computer, a loss function of the neural network according to a training estimated audio signal outputted by the neural network for a training audio signal, the loss function instructing the computer to update one or more hyperparameters of one or more layers of the bandwidth expander.

8. The method according to claim 1, further comprising:
extracting, by the computer, an enrollee voiceprint for an enrollee by applying a speaker recognizer including the embedding extractor on one or more enrollee audio signals of the enrollee;
extracting, by the computer, an inbound voiceprint for an inbound speaker by applying the neural network architecture to the estimated inbound audio signal; and
generating, by the computer, a likelihood score based upon the inbound voiceprint and the enrollee voiceprint, the likelihood score indicating a likelihood that the inbound speaker is the enrollee.

9. The method according to claim 8, further comprising executing, by the computer, one or more data augmentation operations on at least of a second training audio signal and an enrollee audio signal.

10. The method according to claim 9, wherein executing the one or more data augmentation operations includes applying the bandwidth expander on the at least of the second training audio signal and the enrollee audio signal.

11. The method according to claim 8, further comprising generating, by the computer, an estimated enrollee audio signal for the one or more enrollee audio signals by applying the bandwidth expander on an enrollee audio signal having the first bandwidth and originated via a channel configured for the first bandwidth.

12. A system comprising:
a non-transitory machine-readable memory configured to store machine-readable instructions for one or more neural networks; and
a computer comprising a processor configured to:
obtain a plurality of training audio signals including one or more lower-bandwidth audio signals having a first bandwidth and one or more corresponding higher-bandwidth audio signals having a second bandwidth, wherein the first bandwidth is comparatively lower than the second bandwidth;
train a bandwidth expander comprising a set of one or more neural network layers of a neural network and an embedding extractor comprising a second set of one or more neural network layers of the neural network using a plurality of joint labels for joint training by:
applying the neural network on the plurality of training audio signals and the plurality of labels associated with the plurality of training audio signals, wherein the plurality of labels indicate features of the plurality of training audio signals, and wherein the computer determines that the bandwidth expander is trained in response to determining that a level of error a predicted feature vector extracted by the bandwidth expander and an expected feature vector indicated by one or more labels of a training audio signal satisfies a training threshold;
receive an inbound audio signal having the first bandwidth; and
generate an estimated inbound audio signal having the second bandwidth by applying the bandwidth expander of the neural network on the inbound audio signal.

13. The system according to claim 12, wherein to obtain the plurality of training audio signals the computer is further configured to:
generating, by the computer, a lower-bandwidth audio signal having the first bandwidth by executing a codec program on a higher-bandwidth audio signal having the second bandwidth.

14. The system according to claim 12, wherein to obtain the plurality of training audio signals the computer is further configured to:
generate a simulated lower-bandwidth audio signal having a type of degradation by executing an augmentation operation for the type of degradation on a lower-bandwidth audio signal, the plurality of training audio signals further comprising the simulated lower-bandwidth audio signal, and
wherein the inbound audio signal has the type of degradation, whereby the estimated inbound audio signal generated by the computer is an enhanced inbound audio signal having comparatively less of the type of degradation.

15. The system according to claim 12, further comprising:
extract one or more features from each of the training audio signals, wherein the computer applies the neural network on the one or more features of the training audio signals; and
extract the one or more features from the inbound audio signal, wherein the computer applies the neural network on the one or more features of the inbound audio signal.

16. The system according to claim 12, wherein at least one higher-bandwidth audio signal of the plurality of training signals originated via a channel configured for the second bandwidth.

17. The system according to claim 12, wherein the computer generates the estimated inbound audio signal, in response to the computer determining that the inbound audio signal originated via a channel configured for the first bandwidth.

18. The system according to claim 12, wherein the computer is further configured to:
execute a loss function of the neural network according to a training estimated audio signal outputted by the neural network for a training audio signal, the loss function instructing the computer to update one or more hyperparameters of one or more layers of the bandwidth expander.

19. The system according to claim 12, wherein the computer is further configured to:
extract an enrollee voiceprint for an enrollee by applying a speaker recognizer including the embedding extractor on one or more enrollee audio signals of the enrollee;
extract an inbound voiceprint for an inbound speaker by applying the neural network architecture to the estimated inbound audio signal; and
generate a likelihood score based upon the inbound voiceprint and the enrollee voiceprint, the likelihood score indicating a likelihood that the inbound speaker is the enrollee.

20. The system according to claim 19, wherein the computer is further configured to:
generate an estimated enrollee audio signal for the one or more enrollee audio signals by applying the bandwidth expander on an enrollee audio signal having the first bandwidth and originated via a channel configured for the first bandwidth.

* * * * *